United States Patent
Hon et al.

(10) Patent No.: US 7,389,517 B2
(45) Date of Patent: Jun. 17, 2008

(54) METHOD AND SYSTEM FOR CREATING AND PROVIDING A MULTI-TIER NETWORK SERVICE USING SEPARATED FUNCTION AND PRESENTATION COMPONENTS

(75) Inventors: Lenny Hon, Richmond Hill (CA); Ken Schneider, Aurora (CA)

(73) Assignee: RCE Emergis, Inc., Montreal (CA)

( * ) Notice: Subject to any disclaimer, the term of this patent is extended or adjusted under 35 U.S.C. 154(b) by 771 days.

(21) Appl. No.: 10/741,216

(22) Filed: Dec. 19, 2003

(65) Prior Publication Data

US 2005/0138650 A1 Jun. 23, 2005

(51) Int. Cl.
*G06F 9/44* (2006.01)

(52) U.S. Cl. .................................. 719/330; 707/103 R

(58) Field of Classification Search ................. 719/310, 719/328, 330–332; 709/225–231; 707/1, 707/10, 100, 103 R; 717/107
See application file for complete search history.

(56) References Cited

U.S. PATENT DOCUMENTS

| | | | | |
|---|---|---|---|---|
| 6,434,568 B1* | 8/2002 | Bowman-Amuah | ..... | 707/103 R |
| 6,640,249 B1* | 10/2003 | Bowman-Amuah | ......... | 709/228 |
| 6,687,702 B2* | 2/2004 | Vaitheeswaran et al. | ...... | 707/10 |
| 6,687,848 B1* | 2/2004 | Najmi | ........................... | 714/4 |
| 6,753,889 B1* | 6/2004 | Najmi | ........................ | 715/784 |
| 6,959,340 B1* | 10/2005 | Najmi | ........................ | 709/246 |
| 7,007,088 B1* | 2/2006 | Najmi | ........................ | 709/225 |
| 7,043,716 B2* | 5/2006 | Zimmer et al. | ............. | 717/107 |
| 2003/0009437 A1* | 1/2003 | Seiler et al. | .................... | 707/1 |
| 2003/0014552 A1* | 1/2003 | Vaitheeswaran et al. | .... | 709/312 |
| 2003/0204517 A1* | 10/2003 | Skinner et al. | ............. | 707/100 |
| 2003/0217170 A1* | 11/2003 | Nelson et al. | .............. | 709/231 |

FOREIGN PATENT DOCUMENTS

| WO | WO 01/37170 A2 | 5/2001 |
|---|---|---|
| WO | WO 02/0524433 A1 | 7/2002 |

OTHER PUBLICATIONS

International Search Report and Written Opinion, PCT/CA2004/002153, Mar. 23, 2005, 11 pages.

\* cited by examiner

*Primary Examiner*—Van H. Nguyen
(74) *Attorney, Agent, or Firm*—Fenwick & West LLP

(57) ABSTRACT

A multi-tier application for interaction with a user interface comprises a presentation tier (e.g. a web server with a JSP/servlet engine) and a business logic tier (e.g. an application server) to manipulate data for subsequent presentation on the user interface. A direction module, such as a requested resource definition, has a plurality presentation and function definitions for accessing a presentation component defined externally to the requested resource definition and the function definition for identifying a function component also defined externally to the requested resource definition. The direction module can have a plurality of coupled directions, including a function direction to direct a corresponding functional component to perform a data processing function and provide a data processing output, and a presentation direction to direct a corresponding presentation component to incorporate the data processing output, when applicable, into a presentation template to produce a presentation element for the user interface.

56 Claims, 19 Drawing Sheets

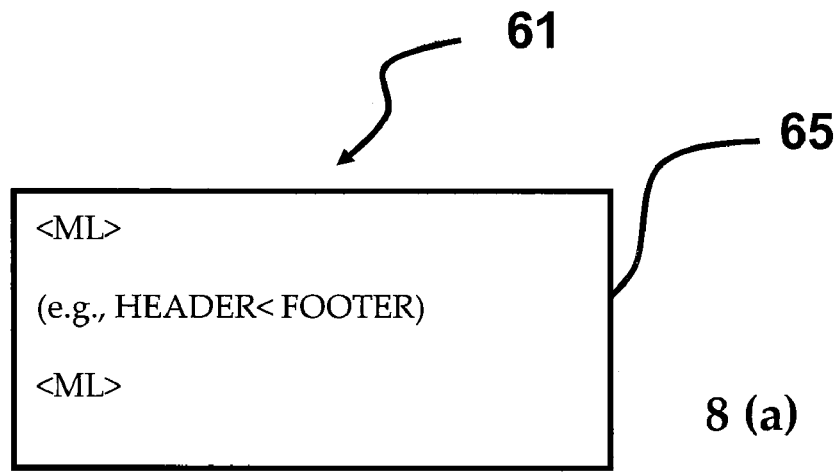
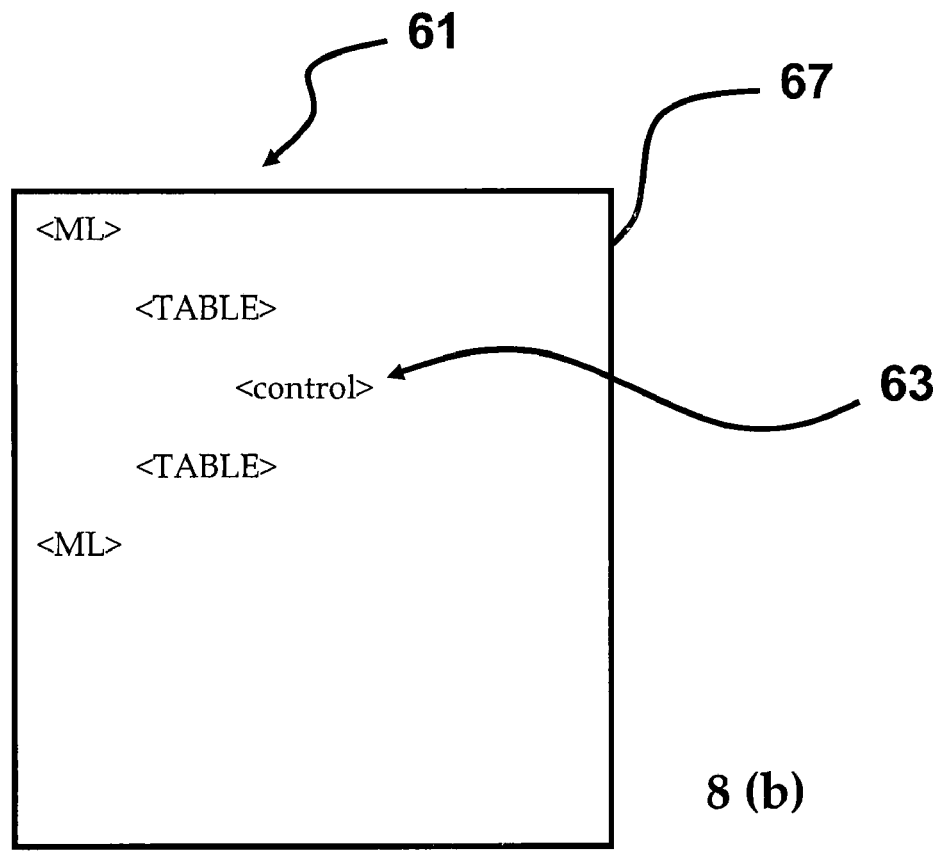
FIG. 8

METHOD AND SYSTEM FOR CREATING AND PROVIDING A MULTI-TIER NETWORK SERVICE USING SEPARATED FUNCTION AND PRESENTATION COMPONENTS

The present invention relates to a method and system for creating and providing a multi-tier networked service.

BACKGROUND OF THE INVENTION

Internet or web based client applications for delivering a networked service generally have two main components. The first is the "look and feel" component of the client application. The second component is the client's application functionality. The "look and feel" has traditionally been the purview of a web designer, who has the requisite skills to prepare and create the presentation elements of the application. The client application's functionality traditionally has been handled by a web developer, who creates, implements and assembles the functional elements of the client application.

The presentation and functional elements of a client application are normally incorporated in the same application files, the result being that designers and developers work on the same file. There are several potential disadvantages associated with this approach. For example, if any element of the client application (presentation or function) is changed, then the whole client application client may have to be recompiled. Also, there may be potential problems relating to version control, duplication of work, and client application extensibility.

The advent of Java and Java Server Pages remedied some of these problems. A Java Server Page in conjunction with Java Beans or enterprise Java Beans permitted many of the functional elements of a client application to be separated from the presentation elements, thereby permitting the developer to create and modify the functional units (e.g.,java beans) while freeing the presentation elements of the java server page to the web designer. This approach, however, continues to suffer from many of the same drawbacks as the traditional client application approach. If a presentation or functional element changed, then it may be necessary to amend and possibly recreate the Java Server Page. Since the Java Server Page still includes both functional and presentation elements, there also remains the potential problems of version control and work duplication.

It is an object of the present invention to provide a multi-tier application to obviate or mitigate at least some of the above presented disadvantages.

SUMMARY OF THE INVENTION

The presentation and functional elements of a client application are normally incorporated in the same application files, the result being that designers and developers work on the same file. There are several potential disadvantages associated with this approach. For example, if any element of the client application (presentation or function) is changed, then the whole client application client may have to be recompiled. Also, there may be potential problems relating to version control, duplication of work, and client application extensibility. Contrary to present client applications, there is provided a multi-tier application for interaction with a user interface, such as a browser on a PC or PDA. The application comprises a presentation tier (such as a web server with a JSP/servlet engine) and a business logic tier (such as an application server) to manipulate data for subsequent presentation on the user interface. A direction module has a plurality of coupled directions, including a function direction to direct a corresponding functional component to perform a data processing function using the business logic tier and provide a data processing output, and a presentation direction to direct a corresponding presentation component to incorporate the data processing output, when applicable, into a presentation template to produce a presentation element for the user interface. The function component and presentation component are independent and separate from each other, the connection being the function component produces the data and the presentation component consumes the output data. The presentation component is an abstract representation of a general kind of presentation element, each specific presentation element having its layout and format (such as markup language) stored in a different presentation template, and the reference to a specific presentation template for the presentation component can be determined at processing time in the presentation tier.

According to the present invention, there is provided a method for hosting a computer executable multi-tier application for interaction over a network with a user interface, the application including an application presentation tier. The method comprises the steps of: selecting a first presentation template, the first template including a first presentation instruction for defining a corresponding first presentation element; selecting a first presentation component of the application presentation tier for processing the first presentation instruction; and linking the first presentation component to the first template, wherein the first component processes the first presentation instruction and generates the first presentation element during execution of the multi-tier application for subsequent delivery to the user interface.

The method comprises the additional steps of: selecting a second presentation template, the second template including a second presentation instruction for defining a corresponding second presentation element; selecting the first presentation component for processing the second presentation instruction; and linking the first component to the second template; wherein the first component processes the second presentation instruction and generates the second presentation element during execution of the multi-tier application for subsequent delivery to the user interface.

In a preferred embodiment, the presentation templates are computer readable files of a file system and the presentation instructions are selected from the group comprising: layout, style and format of the first presentation element. In a further embodiment, the presentation instructions are written in a markup language selected from the group comprising: HTML, HDML and WML.

The first presentation component is a computer executable file. In a preferred embodiment, the computer executable file is a java bean.

The method may also include an application logic tier and the additional steps of: selecting an input datum; selecting a first function component of the application logic tier for processing the input datum; linking the input datum to the first function component, wherein the first function component processes the input datum and generates an output datum during execution of the multi-tier application; directing the first presentation component to process an output data presentation instruction for further defining the corresponding first presentation element to include the output datum, wherein the first presentation component processes the output datum presentation instruction and generates the first presentation element incorporating the output datum during execution of the multi-tier application.

The first function component is a computer executable file. In a preferred embodiment, the computer executable file is a java bean.

The present invention also provides a system for hosting a computer executable multi-tier application for interaction over a network with a user interface, the application including an application presentation tier. The system comprises a first presentation template, the first template including a first presentation instruction for defining a corresponding first presentation element; a first presentation component of the application presentation tier for processing the first presentation instruction; and, a first direction element for linking the first presentation component to the first template; wherein the first component processes the first presentation instruction and generates the first presentation element during execution of the multi-tier application for subsequent delivery to the user interface.

The system may also include a second presentation template, the second template including a second presentation instruction for defining a corresponding second presentation element; and a second direction element for linking the first component to the second template, wherein the first component processes the second presentation instruction and generates the second presentation element during execution of the multi-tier application for subsequent delivery to the user interface.

The system may further include a first function component of the application logic tier for processing an input datum; and, the first direction element further linking the input datum to the first function component, wherein the first function component processes the input datum and generates an output datum during execution of the multi-tier application. An output data presentation instruction further defines the corresponding first presentation element to include the output datum.

BRIEF DESCRIPTION OF THE DRAWINGS

These and other features of the preferred embodiments of the invention will become more apparent in the following detailed description in which reference is made to the appended drawings wherein:

FIG. 8(a) is a schematic illustration of a static presentation component according to an embodiment of the present invention;

FIG. 8(b) is a schematic illustration of a dynamic presentation component according to an embodiment of the present invention;

DESCRIPTION OF THE PREFERRED EMBODIMENTS

Figure 1:
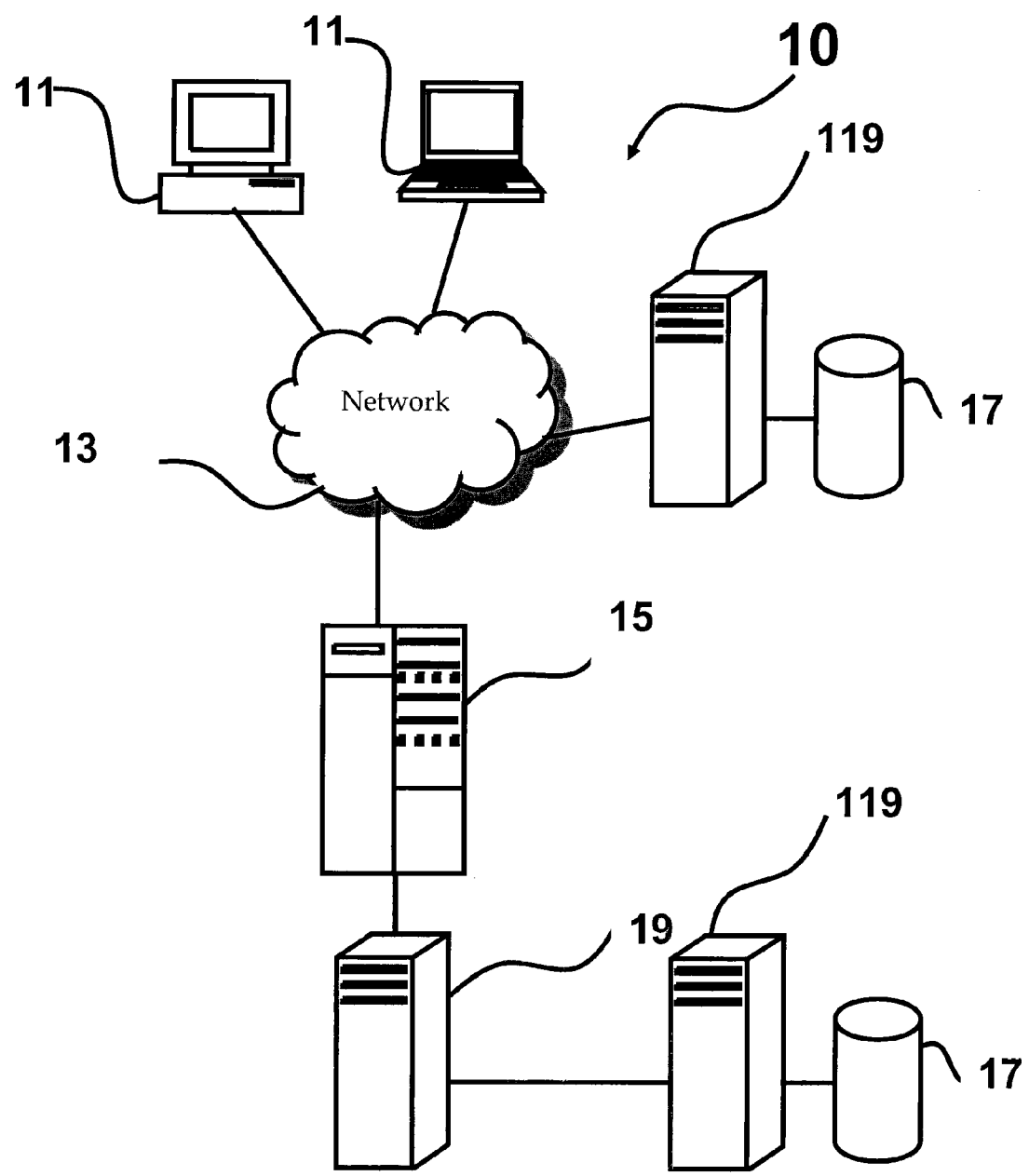
FIG. 1 is a schematic view of a system according to an embodiment of the present invention.

Referring to FIG. 1, a schematic view of a system 10 is illustrated. The system 10 is a computing network as is known to those skilled in the art. An individual operating a network terminal 11 may access a remotely located resource via a communications network 13. The communications network 13 may be the Internet, the World Wide Web, a LAN, WAN, VPN.

The network terminal may be any network appliance known to those skilled in the art, which includes means to communicate with the remotely located resource and means to transmit a request via the communications network 13:a personal computer, lap top computer, palm top computer, hand held device, wireless text messenger cell phone, etc.

The remotely located resource may be a web page located on a web server 15 or data that is located in a database 17, which is accessed by an application server 19 (via database server 119) that is connected to (or in communication with) the web server 15.

Alternately, the application server 19 and associated database 17 may be accessed directly over the communications network 13, without the need of the web server 15. For example, an individual operating a personal computer (i.e. terminal 11) may access a remotely located resource via the Internet (i.e. communications network 13) if the personal computer includes means for communicating via the network 13 (e.g. a modem) and executable software for sending a request for the resource to the resource host.

The remotely located resource may be as simple as static HTML document. Alternately, the requested resource may comprise a small portion of a larger service, such as completing an online transaction, which requires the production of several responses that are particular to the given user's current session. The data included in these transactions are dynamic, not static; i.e., they are generated in response to the user's particular request. The requested data may reside in the database 17, which is accessible by the application server 19 via database server 119. The user may simply require the raw data, or the data may be processed and the processed result is incorporated in the response to the user's request. There are several ways by which the requested data may be processed and or incorporated into a response.

Figure 2:
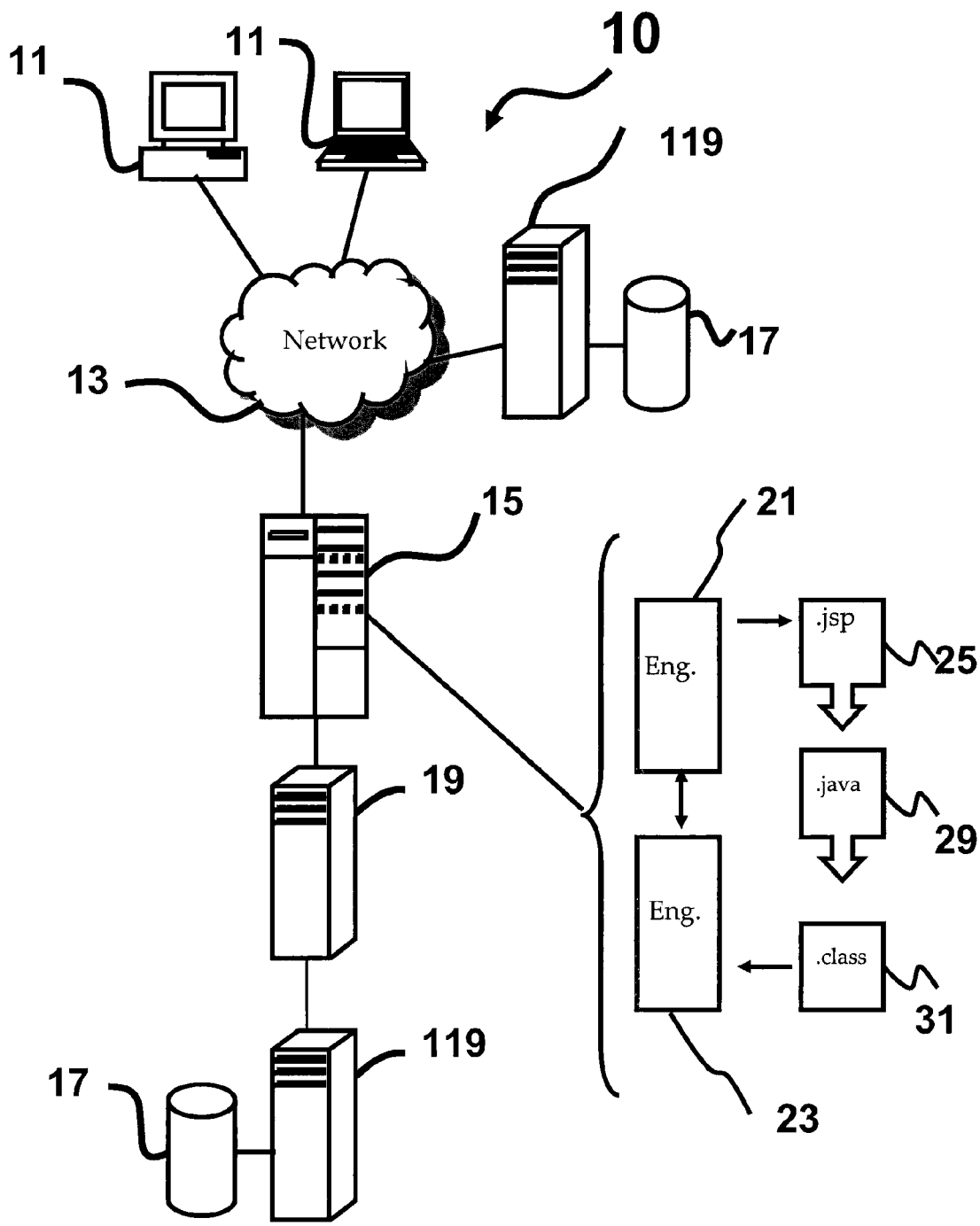
FIG. 2 is an expanded schematic view of the system of FIG. 1.

Referring to FIG. 2, an expanded schematic view of the system 10 illustrates one such way in which a request may be processed, which employs java web server and java server page (JSP) technology. The web server 15 includes a java server page engine 21 and a servlet engine 23, which together process the requested resource (i.e. JSP 25) and generate a response that is returned to the terminal 11.

Figure 3:
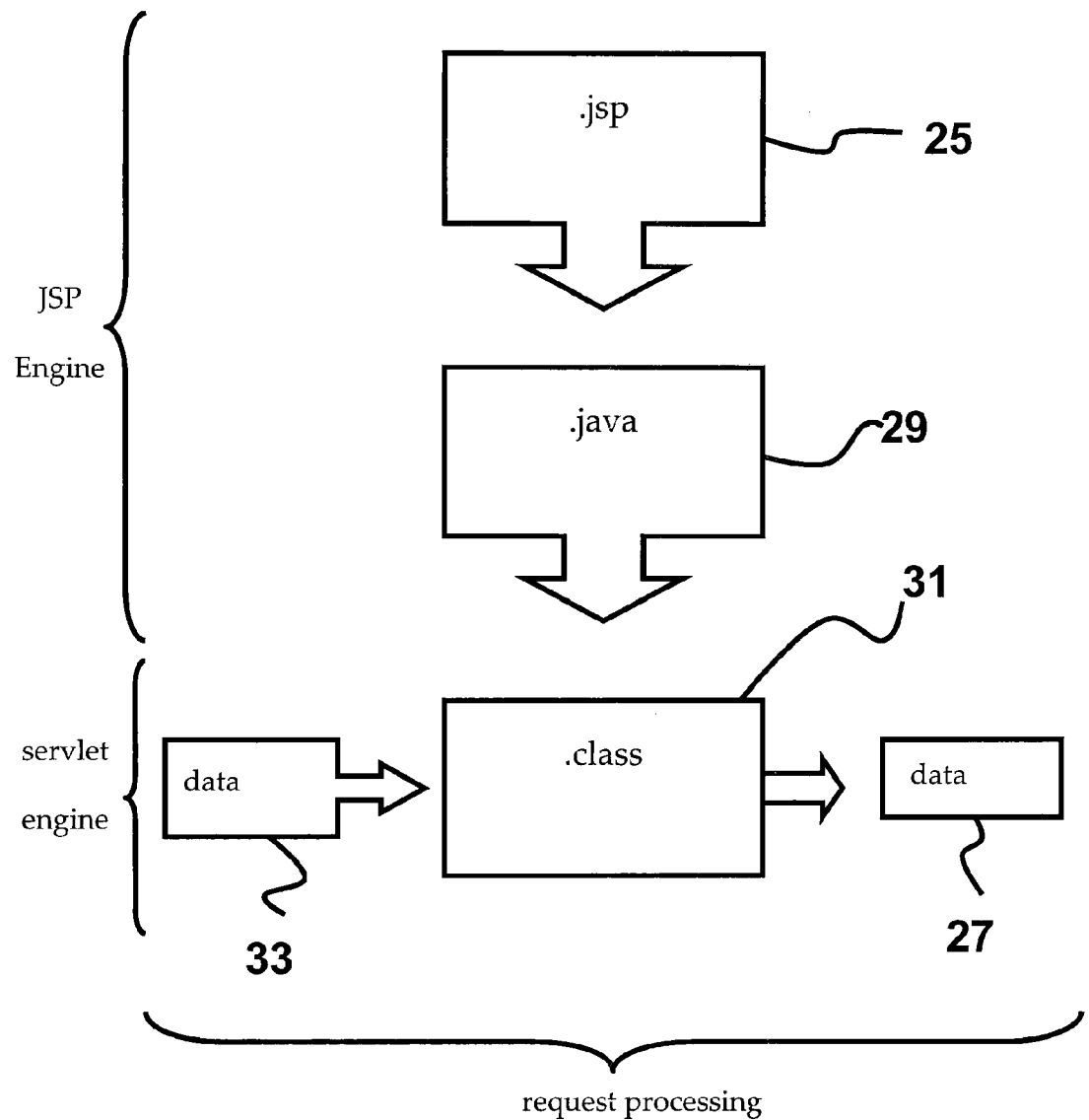
FIG. 3 is a schematic view of the steps in processing a requested resource according to an embodiment of the present invention.

FIG. 3 illustrates schematically an expanded view of the requested resource 25 and the generated response, a data output 27. A user operating the terminal 11 requests a remotely located resource (the java server page 25) via the communications network 13. The web server 15 running the JSP engine 21 receives the resource request and retrieves the requested java server page 25, reads it and translates the JSP elements in to java code 29 (.java). The java code translation 29 is then compiled into a java servlet 31 (.class) using a standard compiler as is known to those skilled in the art. Next, the servlet 31 is executed using a standard API, such as servlet engine 23. As the servlet runs, it processes input data 33 and generates the data output 27; i.e., it processes the request and generates a response. The output 27 is then directed to the terminal 11 via the network 13.

Figure 4:
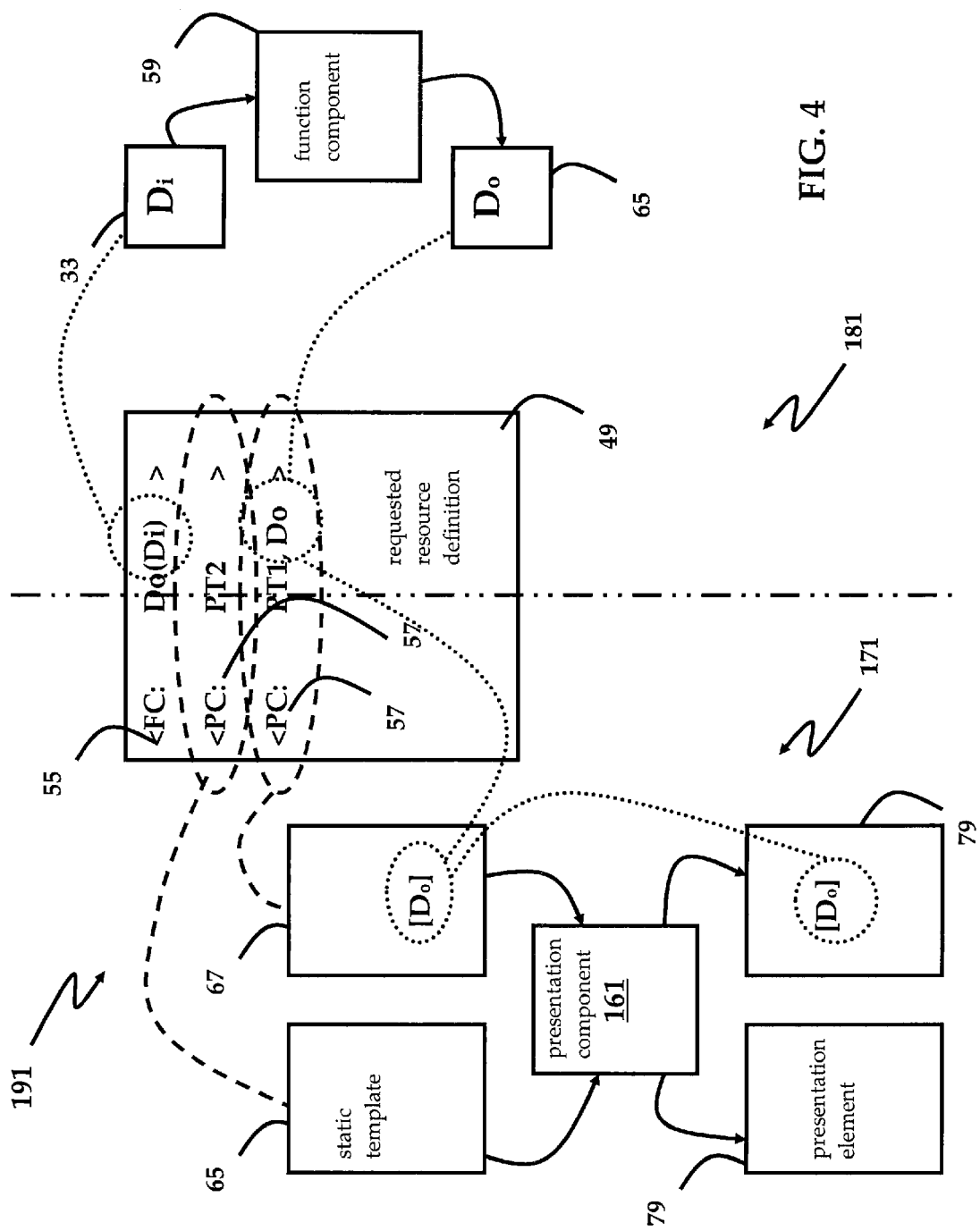
FIG. 4 is a schematic view of the elements within each tier of a multi-tier application according to an embodiment of the present invention.
Figure 13:
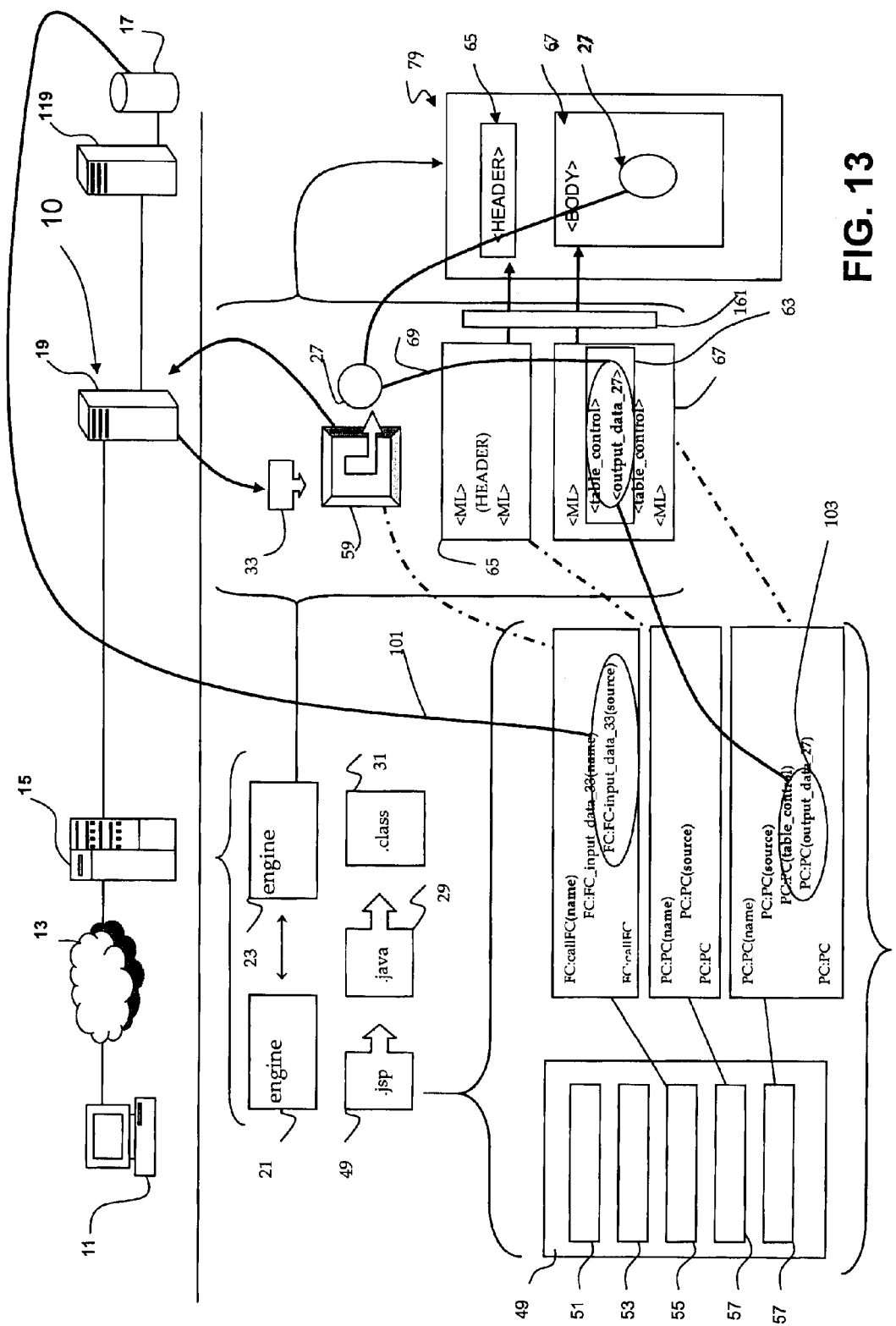
FIG. 13 is an expanded schematic view of the system and the processed outputs of the client application illustrated according to an embodiment of the present invention.

Referring to FIGS. 4 and 13, a system for hosting a computer executable multi-tier application 191 for interaction over a network with a user interface 11, the application 191 including an application presentation tier 171 and an application logic tier 181, and associated elements are illustrated according to a preferred embodiment of the present invention. The system comprises a first presentation template 65, the first template including a first presentation instruction for defining a corresponding first presentation element or output 79; a first presentation component 61 of the application presentation tier 171 for processing the first presentation instruction; and, a first direction element 161 for linking the first presentation component 161 to the first template 65, wherein the first component 161 processes the first presentation instruction and generates the first presentation element during execution of the multi-tier application for subsequent delivery to the user interface 11.

In a preferred embodiment, the system comprises a second presentation template 67, the second template 67 including a second presentation instruction for defining a corresponding second presentation element or output 79; and, a second direction element for linking the first presentation component 161 to the second template 67, wherein the first component 161 processes the second presentation instruction and generates the second presentation element or output 79 during execution of the multi-tier application for subsequent delivery to the user interface 11.

In a still further embodiment, the system comprises a first function component 59 of the application logic tier 181 for processing an input datum 33; and, the first direction element further linking the input datum 33 to the first function component 59, wherein the first function component processes the input datum 33 and generates an output datum 27 during execution of the multi-tier application. An output data presentation instruction further defines the corresponding first presentation element or output to include the output datum 27.

Figure 15:
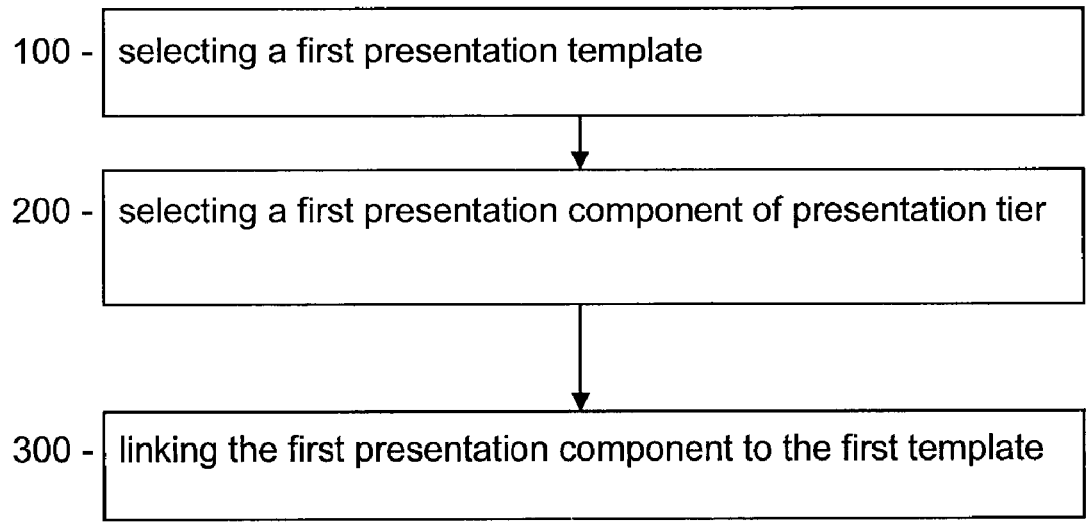
FIG. 15 is a flowchart illustrating the steps in a method according to an embodiment of the present invention.

Referring to FIGS. 4 and 15, a flowchart of a method for hosting a computer executable multi-tier application 191 for interaction over a network with a user interface, the application 191 including an application presentation tier 171, is illustrated according to a preferred embodiment of the present invention. The method comprises the steps of selecting a first presentation template, 65 the first template 64 including a first presentation instruction for defining a corresponding first presentation element (step 100); selecting a first presentation component 161 of the application presentation tier 171 for processing the first presentation instruction (step 200); and, linking the first presentation component to the first template 65 (step 300), wherein the first component 161 processes the first presentation instruction and generates the first presentation element or output 79 during execution of the multi-tier application for subsequent delivery to the user interface.

Figure 16:
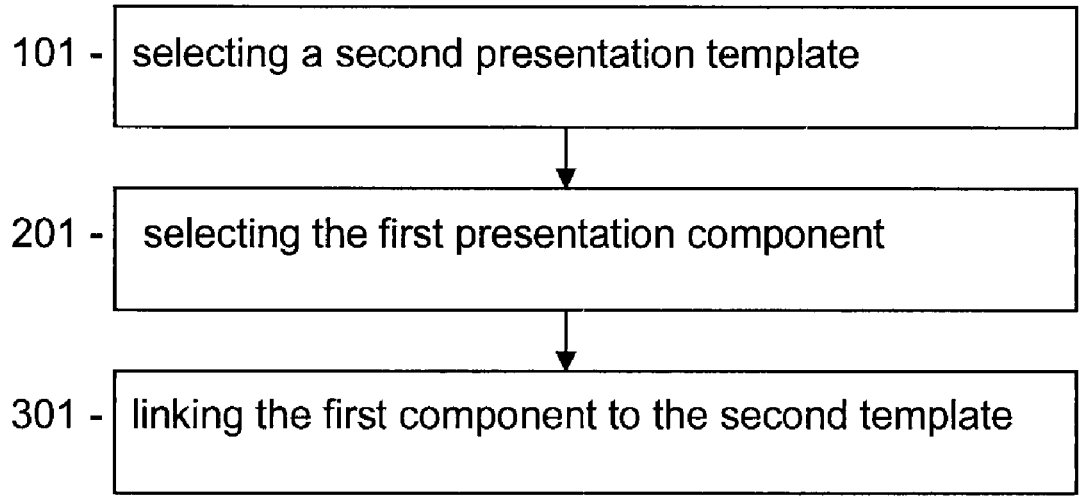
FIG. 16 is a flowchart illustrating further steps in the method of FIG. 15 according to an embodiment of the present invention.

Referring to FIGS. 4 and 16, a flowchart of the additional steps of the method of FIG. 15 is illustrated. The steps further comprise: selecting a second presentation template 67, the second template including a second presentation instruction for defining a corresponding second presentation element or output 79 (step 101); selecting the first presentation component 161 for processing the second presentation instruction (step 201); and, linking the first component 161 to the second template 67 (step 301), wherein the first component 161 processes the second presentation instruction and generates the second presentation element or output 79 during execution of the multi-tier application 191 for subsequent delivery to the user interface.

In a preferred embodiment, the presentation templates 65,67 are computer readable files of a file system and the presentation instructions are such as but not limited to: layout, style and format of the first presentation element. In a further embodiment, the presentation instructions are written in a markup language selected from the group comprising such as but not limited to: HTML, HDML and WML.

The first presentation component 161 is a computer executable file. In a preferred embodiment, the computer executable file is a java bean.

The first presentation component 161 is linked to the first presentation template 65 by a direction element 57. The direction element 57 specifies the location of the first presentation template 65 and directs the first presentation component 161 to the specified location. In a preferred embodiment, the direction element 57 is a first presentation component tag 57 is such as but not limited to page Tag; control Tag; attribute Tag; producePage Tag; clear Tag; and interceptor Tag.

The first presentation component tag 57 is expressed as a directive of a direction module, which implements the multi-tier application. In a preferred embodiment, the direction module is a java server page 49.

Figure 17:
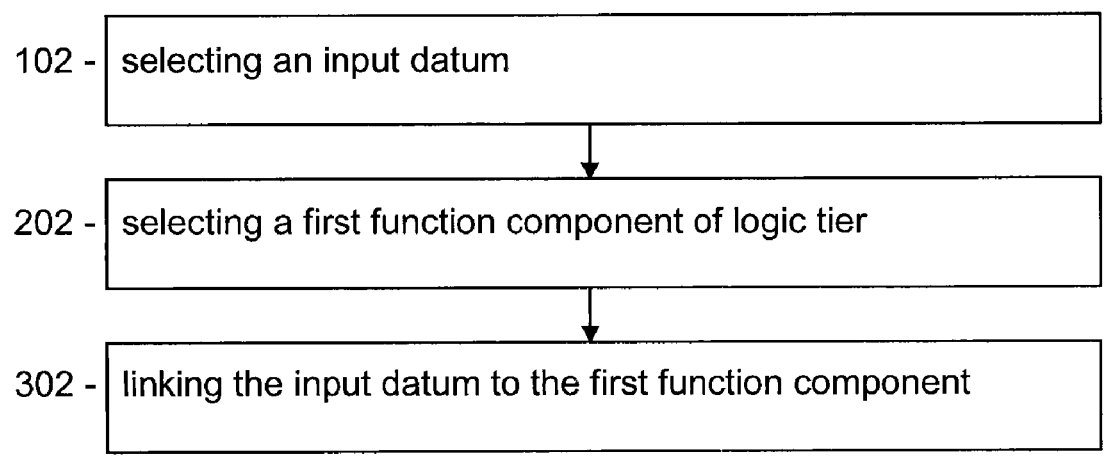
FIG. 17 is a flowchart illustrating alternate further steps in the method of FIG. 15 according to an embodiment of the present invention; and, FIG. 18 is a flowchart illustrating further steps in the method of FIG. 17 according to an embodiment of the present invention.

Referring to FIGS. 4 and 17, a flowchart of the additional steps of the method of FIG. 15 is illustrated, wherein the multi-tier application 191 further includes an application logic tier 181. The steps further comprise selecting an input datum 33 (step 102 ); selecting a first function component 59 of the application logic tier 181 for processing the input datum 33 (step 202 ); and, linking the input datum 33 to the first function component 59 (step 302 ), wherein the first function component 59 processes the input datum 33 and generates an output datum 27 during execution of the multi-tier application 191.

Figure 18:
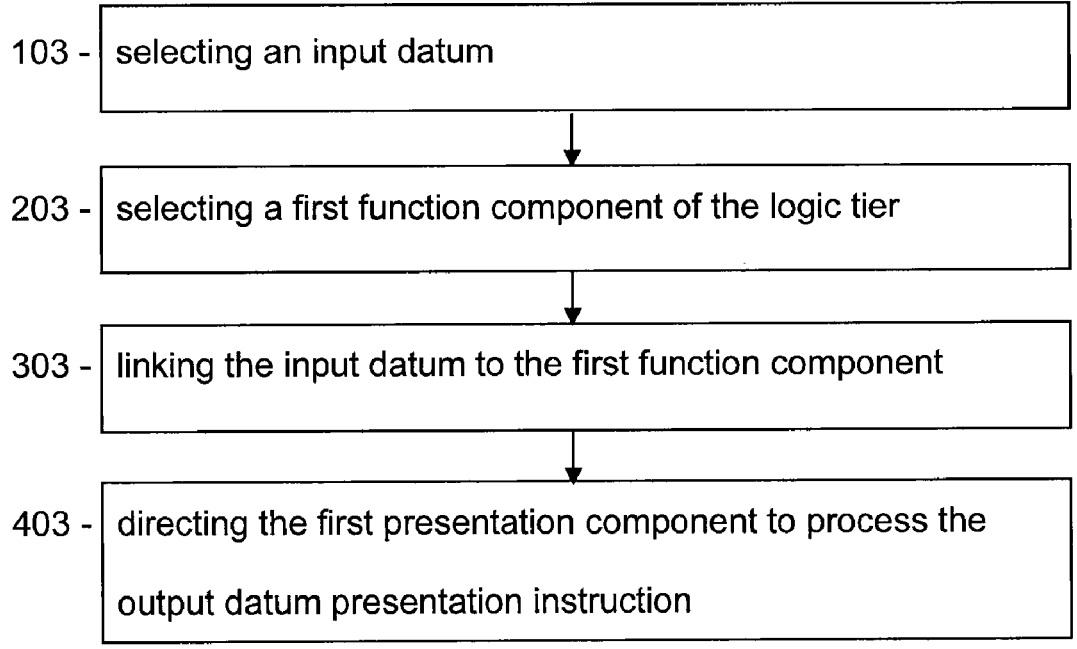

Referring to FIGS. 4 and 18, a flowchart of the additional steps of the method of FIG. 17 is illustrated, wherein the first template further comprises an output data presentation instruction for further defining the corresponding first presentation element to include the output datum 27. The method comprises the additional step of:directing the first presentation component 161 to process the output datum presentation instruction (step 403), wherein the first presentation component 161 processes the output datum presentation instruction and generates the first presentation element or output 79 incorporating the output datum 33 during execution of the multi-tier application 191.

In a preferred embodiment, the output datum presentation instruction defines a control within which the output datum is presented such as but not limited to Text field, Password field, Hidden field, Text area, Table, List box, Check box, Radio button, Image, Push button, Image button, Submit button, Reset button, Link and Span.

The first function component 59 is a computer executable file. In a preferred embodiment, the computer executable file is a java bean.

The first function component 59 is linked to the input datum 33 by a direction element 55. The direction element 55 specifies the location of the input datum 33 and directs the first function component to the specified location. In a preferred embodiment, the direction element 55 is a first function component tag 55 such as but not limited to init Tag; call Tag; prerequisite Tag; debug Tag; error Tag; getValue Tag; if Tag.

In a preferred embodiment, the first function component tag 55 is expressed as a directive of a direction module, the direction module implementing the multi-tier application. The direction module is a java server page 49.

Figure 5:
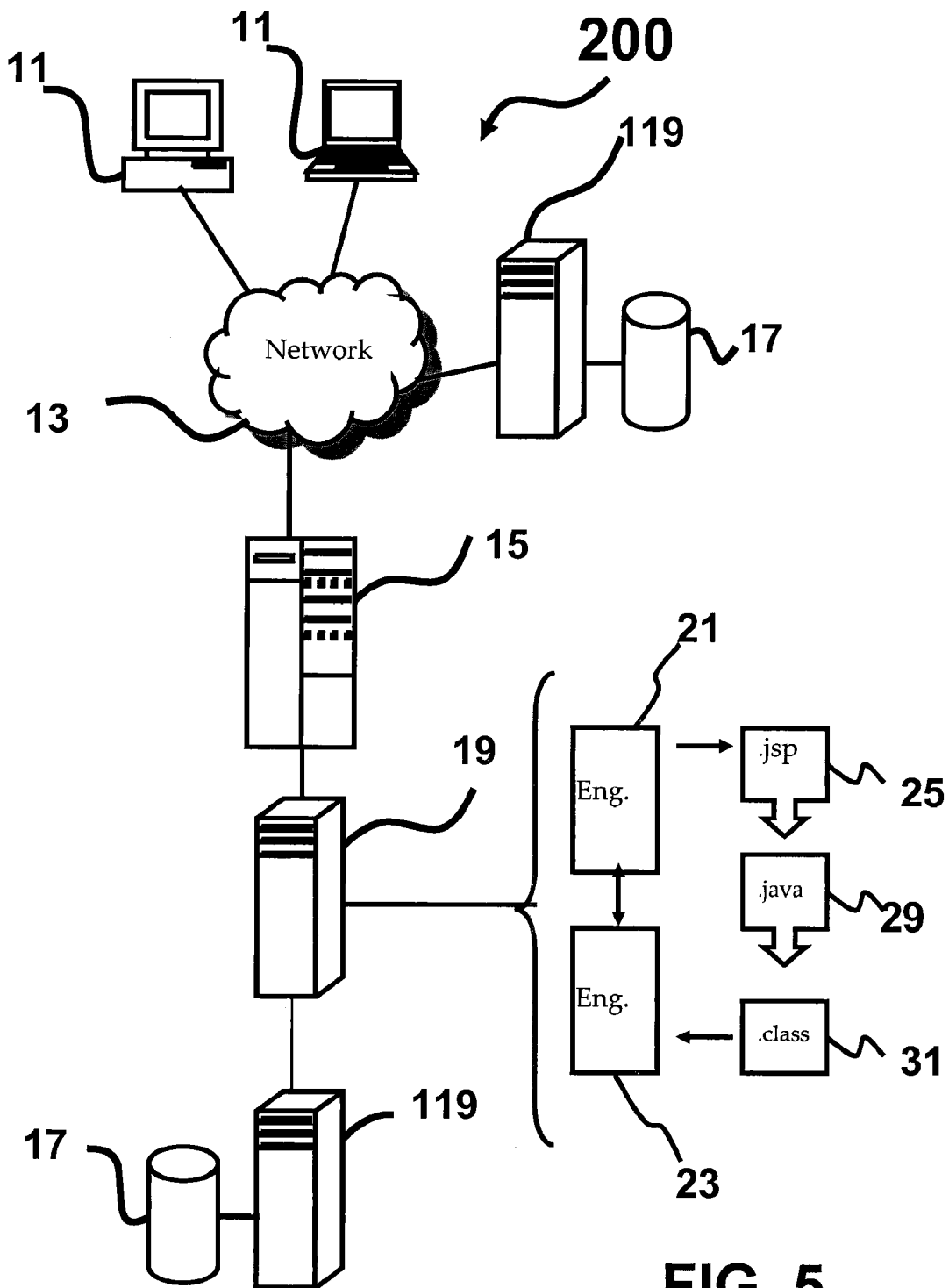
FIG. 5 is a schematic view of an alternate embodiment of the system of FIG. 1.

Referring to FIG. 5, a further alternate embodiment of the system 10 is illustrated schematically as application server servlet system 200. The JSP engine 21 resides on the application server 19. The servlet engine 23 cooperates with the JSP engine 21 in the translation, compilation and execution of the java server page 25. The remotely located resource in the system 200 may include data located on the local database 17, which is accessed directly by the application server 19 via database server 119 and processed by the servlet 31. The output in this case is returned to the user via another mechanism, such as e-mail.

Figure 6A:
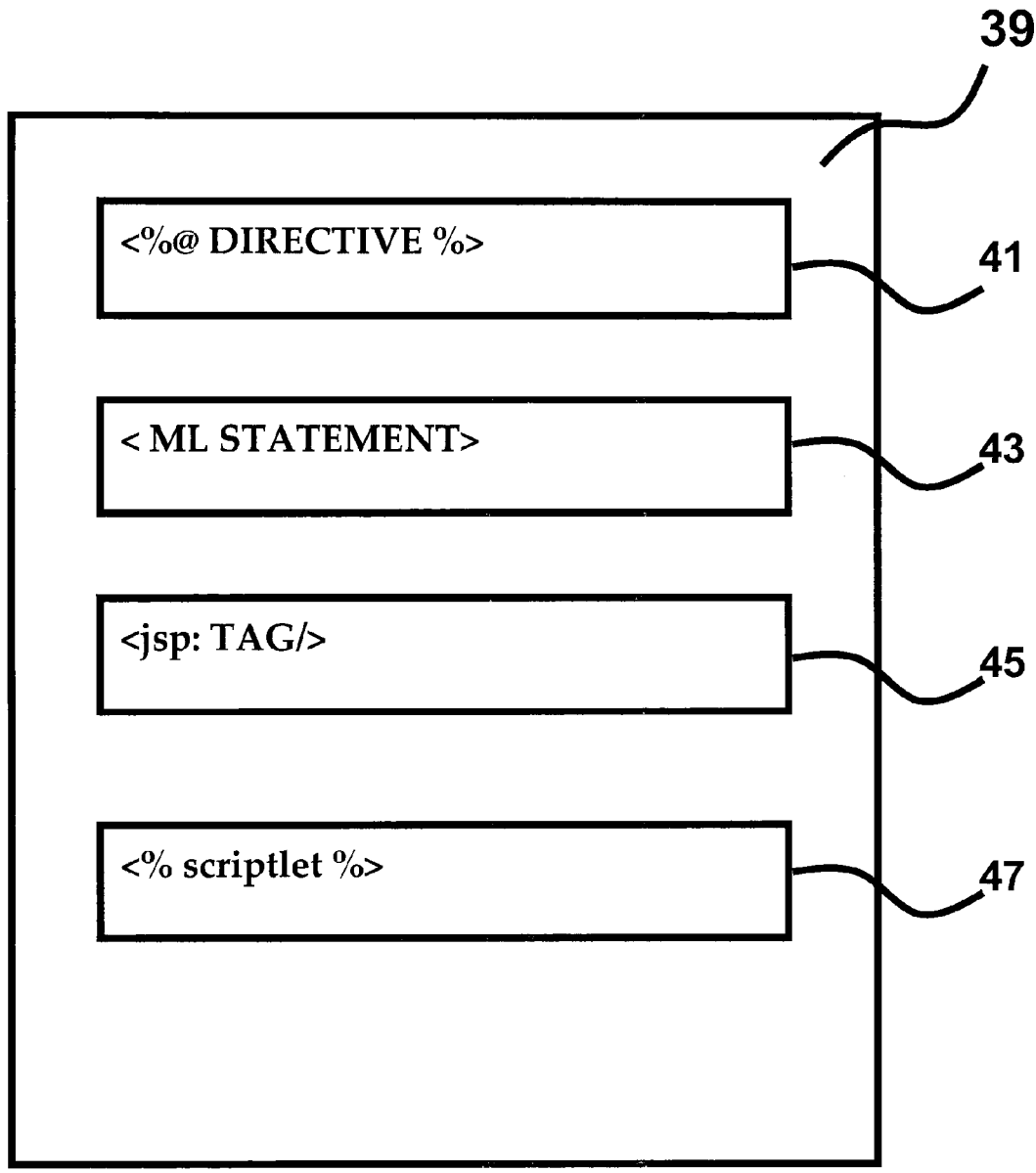
FIG. 6(a) is a schematic illustration of a Java Server Page.
Figure 6B:
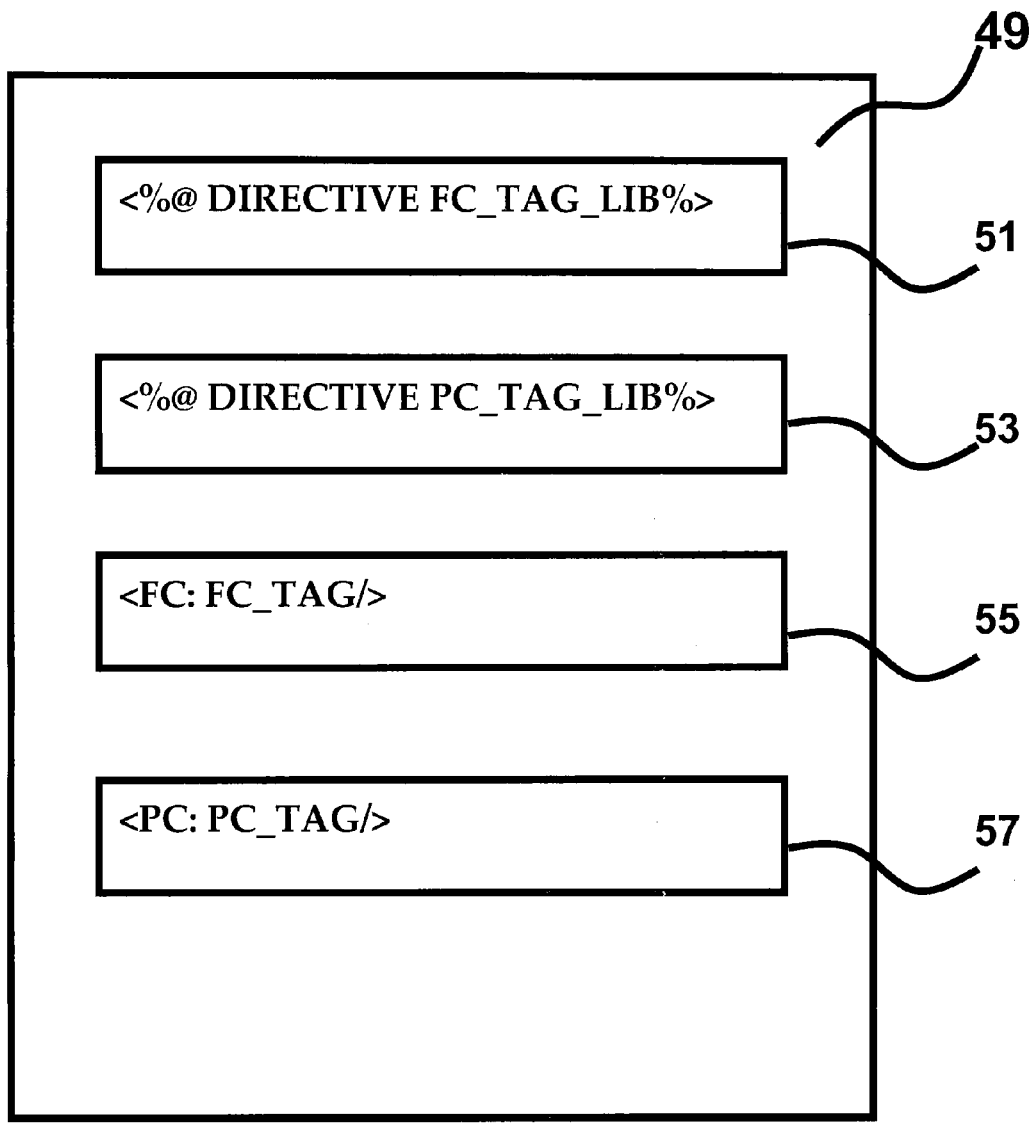
FIG. 6(b) is a schematic illustration of a Java Server Page according to an embodiment of the present invention.

Referring to FIG. 6(*a*), a schematic view of a java server page JSP 39 as is known to those skilled in the art is illustrated. The JSP 39 is a text document that contains static template data (which can be expressed in any text based format, such as HTML, WML and XML) and JSP elements (which are interpreted by the JSP engine 21).

The static content, which defines the look and feel of the processed output, is created by writing those portions of the JSP 39 using markup (ML) statements 43. For example, if HTML is selected as the ML, then the template portions of the JSP are scripted using HTML statements and syntax.

The dynamic content is created by accessing the Java programming language object properties. The dynamic elements of the JSP 39 typically include JSP directives 41, which pass information to a JSP engine 21, JSP tags 45, which may be implemented as standard tags or customized tags that are used to for example instantiate a java bean on a server, and scriptlets 47, which are small scripts of java code that perform functions not supported by the tags.

The JSP directives 41 may include page_directives (which communicate page specific information, such as buffer and thread information or error handling), language_directives (which specify the JSPs scripting language), include_directives (which can be used to include an external document in the page), and taglib_directives (which indicate a library of custom tags that the page can invoke).

The JSP tags 45 are responsible for implementing most of the JSP processing. These include a number of standard tags (e.g., useBean, setProperty and getProperty). Custom tags may also be designed and implemented for a specific purposes).

Referring to FIG. 6(*b*), a JSP 49 according to a preferred embodiment of the present invention is illustrated. In a preferred embodiment of the present invention, the JSP 49 does not contain any markup language (ML) statements 43, nor does it include Java scriptlets 47. All operational or functional and presentation elements of the JSP 49 are saved as discrete function components and presentation components, respectively. The components 59 and 61 are accessed via respective custom function component tag extensions 55 and presentation component tag extensions 57, which in turn are specified using a function component taglib_directive 51 and a presentation component taglib_directive 53, respectively.

Thus, the java server pages 49, within the architecture of a servlet client application, assembled according to the present invention contain only JSP directives and custom tag extensions 55 and 57.

JSP Directives

The JSP 49 directives take the following form: <%@directiveName attribute="value"%>

Where:

directiveName is the specific directive name attribute is an attribute for this specific directive A directive may have zero or more attributes.

value is the specific value for the specified attribute

An attribute may have exactly one value.

The JSP 49 page Directive

In a preferred embodiment, all JSP processing pages 49 begin with the following page directive:

```
<%@ page session="true" buffer="buffer size kb"
autoFlush="true"
1       isThreadSafe="true" errorPage=". . ./errorPage.jsp" %>
```

Where:
. . ./errorpage.jsp is the URL to another JSP page that will be invoked if an uncaught runtime exception is thrown
If this is an error JSP page, then the following attribute should be included in the page directive: isErrorPage="true"

The JSP 49 taglib Directive

The taglib directive specifies custom tag extensions. The following taglib directives are specified in all JSP processing pages 49 (right after the page directive):

```
<%@ taglib uri="/servlet/FCTagsClient.jar" prefix="FC" %>
<%@ taglib uri="/servlet/PCTagsClient.jar" prefix="PC" %>
```

The JSP 49 include Directive

The include directive can be used to insert, inline, the content of another JSP processing page 49:
<%@ include file=". . ./otherPage.jsp" %>
Where:
. . ./otherpage.jsp is the path to another JSP page that will be included.

Figure 7:
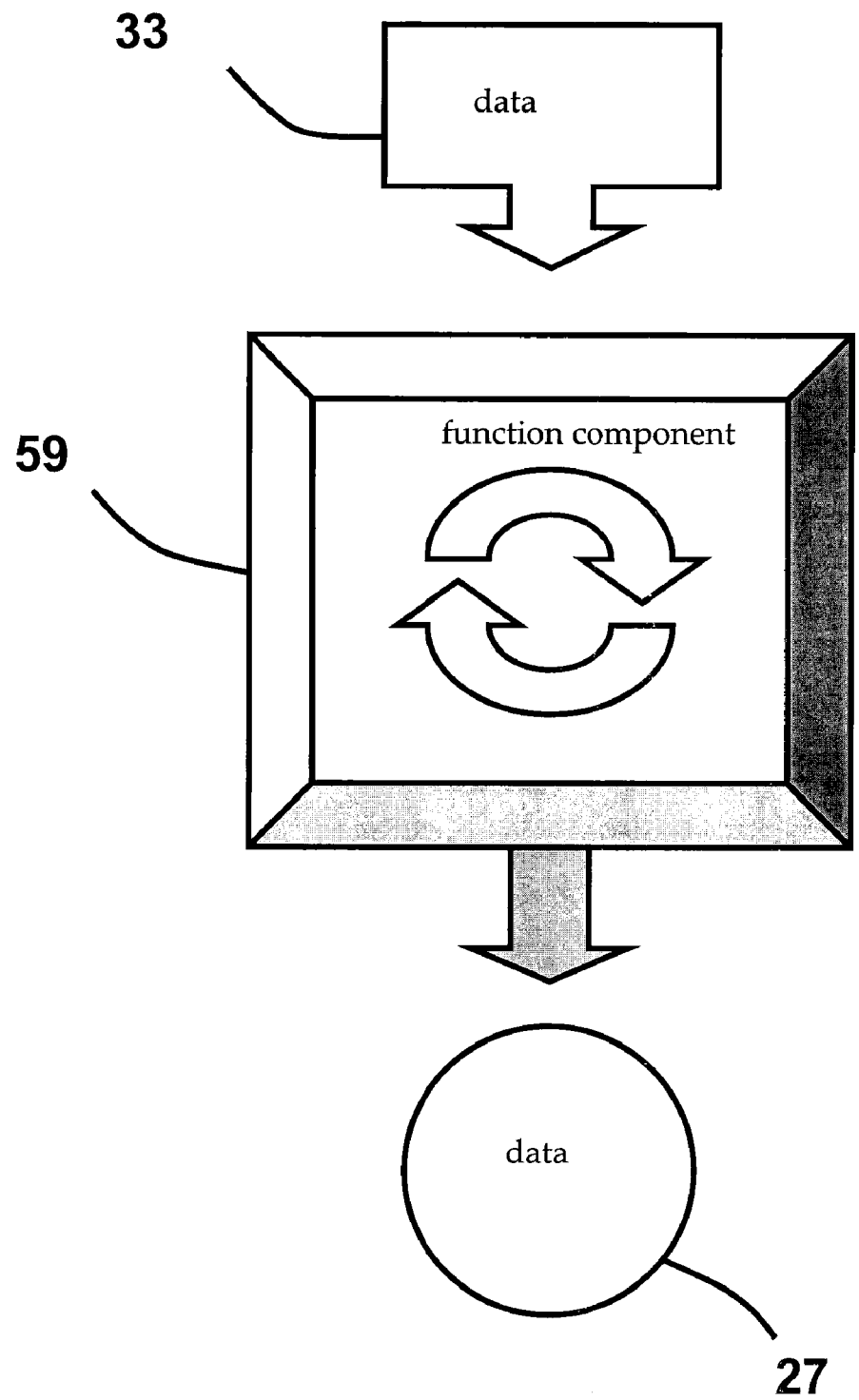
FIG. 7 is a logical view of a function component according to an embodiment of the present invention.
Figure 9:
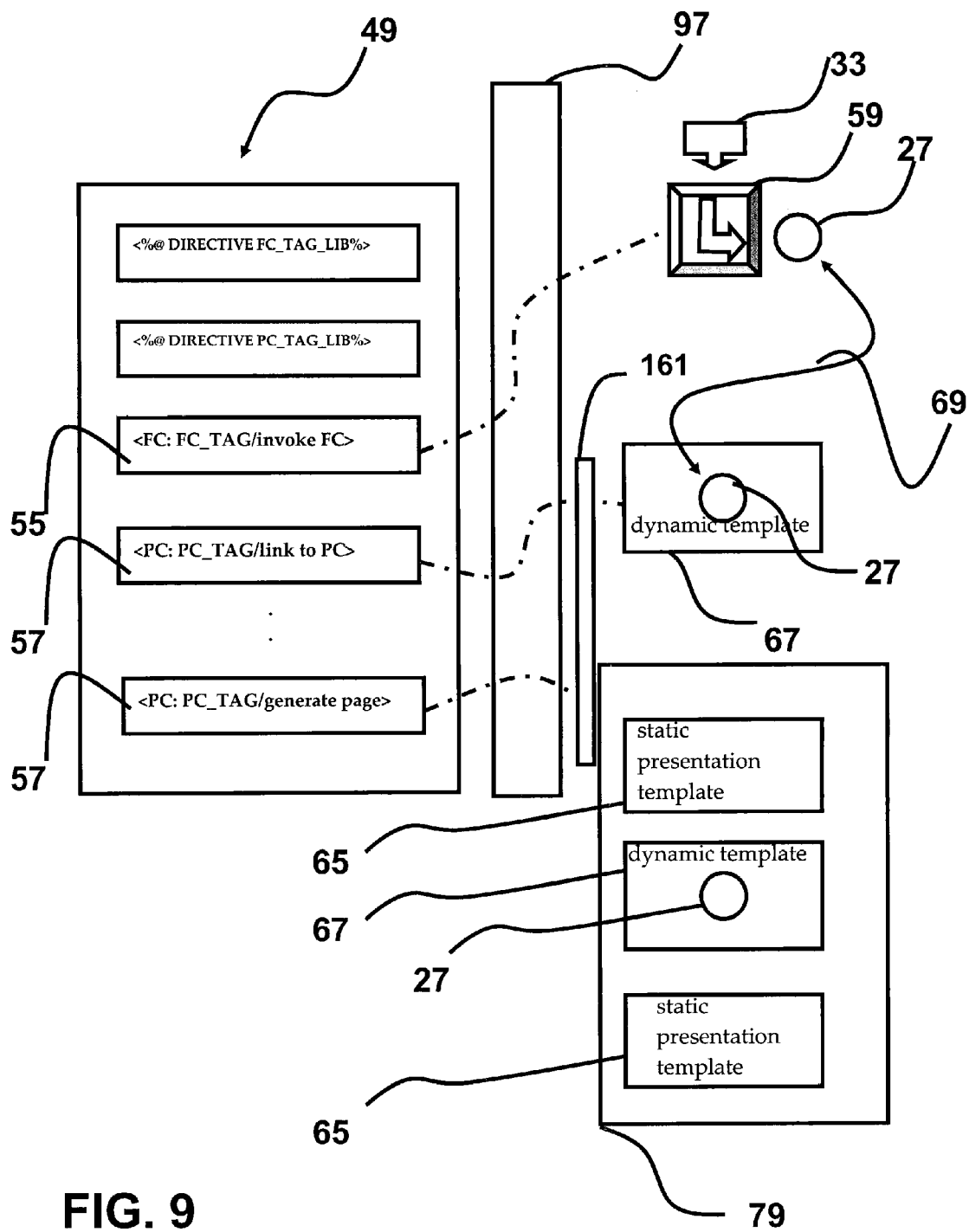
FIG. 9 is a schematic illustration of the output of a processing a Java Server Page according to an embodiment of the present invention.

Function Components (FC):

Referring to FIG. 7, a logical view of the function component 59 is illustrated.

The function component 59 is a distinct, independent piece of business functionality. Each function component 59 receives a set of pre-requisite data 33, performs a processing function using the received data 33 and returns a set of result data 27. In a preferred embodiment, every function component 59 exists as a Java class that is based on a generic base class. When a client application requires a function component 59, it is simply instantiated using Java reflection based on the logical name of the function component 59. The function component 59 conforms to the specification of a Java Bean.

The Public Abstract Class FC is the generic definition for all function components 59. All specific function component 59 classes extend this base class. This abstract class provides a set of built-in functionality inherited by all function component 59 classes as well as defining the set of functionality that must be implemented specifically within the function component 59 class itself.

The Public Class {ApplicationCategory}{Function}:

Any given function component 59 is defined further by a specific class that extends the Function Component 59 class.

In a preferred embodiment, the naming convention for a specific function component 59 class is {ApplicationCategory} {Function} where:
  {ApplicationCategory} is a short form indicating the application category that the function component 59 belongs to (e.g. Order for the Net*Order application category, Track for the Net*Track application category, or General for the General application category)
  {Function} is a short but descriptive phrase indicating the function of this specific function component 59 (e.g. PerformProductSearch for a function component 59 that actually performs a search of a catalogue and returns a series of products)

Function Component Instances

A function component 59 is instantiated with a function component 59 instance name so that multiple instances can be uniquely named. In a preferred embodiment, the function component 59 instance name is:
  {ApplicationCategory}{Function}_{InstanceDescription}
  Where:
  {InstanceDescription} is a short descriptive reference for this specific instance of the function component 59
  e.g. OrderPerformProductSearch_OrderEntry Public Method setInstanceDescription ( )

This method is used to set the instance description for the function component 59. This method is often called immediately after instantiation of the function component 59.

Public Method getInstanceDescription ( )

This method returns the instance description for the function component 59.

Public Method getInstanceName ( )

This method returns the instance name for the function component 59.

Prerequisite Data 33 And Returned Result Data 27

In a preferred embodiment, all prerequisite data 33 and returned result data 27 are stored as instance variables. The name of the instance variable is the name of the prerequisite data element itself. In addition there is a set and get method for each of these instance variables which uses the same naming conventions. This allows the prerequisite data 33 to be referenced externally by using Java reflection. For example, if a function component 59 has a prerequisite data element 33 named userID then there is an instance variable named userID that is set externally using the public method named setUserID ( ). In the case where this is also a returned result data 27 element, then the data 27 is returned using the public method getUserID ( ). In the case of a returned result data element, there is a public get method.

Protected Method Validate ( )

The validate ( ) method is called from within the execute ( ) method, prior to actually executing any processing logic of the function component 59. If there is any missing or incorrectly set prerequisite data 33, then the FC_EXCEPTION_PrerequisiteData FCException exception is returned.

Public Method Execute ( )

The execute ( ) method provides the internal processing logic of the function component 59. Prior to performing any specific processing, all of the prerequisite data 33 is validated. As return result data 27 is produced, it is stored into the respective instance variables. If an error occurs during the execution of the processing logic, the appropriate FCException exception is returned.

Public Class FCException

This class represents an error that has occurred during either the validation of prerequisite data 33 or during the execution of the processing logic of a function component 59.

Public FC_EXCEPTION_PrequisiteData

This exception indicates that the prerequisite data 33 does not conform to the requirements defined by the function component 59 definition. Such an exception is typically caused by an error in the specific call to the function component 59.

PublicFC_EXCEPTION_FCInternal

This exception indicates that there has been an unexpected error during the internal processing logic of the function component 59. Such an exception is typically caused by an error within the function component 59 logic itself.

PublicFC_EXCEPTION_ServerInternal

This exception indicates that there has been an unexpected error during the internal processing logic of the function component 59 involving the call to a server. Such an exception is typically caused by an error within the function component 59 logic itself or within the server logic.

PublicFC_EXCEPTION_Exception

This exception indicates that an attempt was made to return an invalid function component exception. The FCException itself can only return this exception. Such an exception is caused by an error within the function component 59 logic itself.

PublicFC_EXCEPTION_Assertion

This exception indicates that an assertion failed.

Other Exceptions

The function component 59 itself can define its own function component exception by specifying its own exception identifier when the function component exception is constructed. The specific meaning of the exception is defined by the function component 59.

Public Method getExceptionID ( )

This method returns the exception identifier.

Public Method getFailureReason ( )
This method returns the failure reason.

Public Method toString ( )
This method returns a printable version of the exception.

Function Component (FC) Tag Extensions:
The function components 59 are invoked using a set of function component tag extensions 55.

The Function Component:init Tag
This tag initializes the page for function component 59 processing. In a preferred embodiment, this tag is the first function component custom tag on every page where function component custom tags 55 are utilized. This tag has the following format:

```
[<functioncomponent:init classpath="classpath" scope="scope"
/>]
```

Where:
classpath is the classpath to search for when instantiating function components 59,
scope is the default scope for the storage of function components 59 instantiated on the JSP 49. The scope can be any one of the following values:application, session or request. If the scope is not specified, the default scope is session.
e.g. session
Both the classpath attribute and the scope attribute are optional.

The Function Component:call Tag
This tag 55 defines that a specific function component 59 is to be invoked. This tag has the following format:

```
<functionComponent:call name="functionComponentInstanceName"
debugLevel = "debugLevel" >
dontResetAllData="yes"scope="scope"
conditionalExecution="true" >
functionComponent-body
</functionComponent:call>
```

Where:
functionComponentInstanceName is the function component 59 instance to invoke. If this function component 59 instance has already been invoked within the current execution of the function, then it is reused. Otherwise this function component 59 instance is created.
e.g. OrderGet_OrderEntry
debugLevel is the debug level for this specific function component 59 call, specified as high, medium or low
dontResetAllData specifies that the resetAllData ( ) method of the function component 59 will not be called. Normally the resetAllData ( ) method of the function component 59 will always be called prior to the setting of any prerequisite data 33 for this function component call. The resetAllData ( ) method can act differently than simply using the empty attribute on all prerequisite data 33. For numeric values, using the empty attribute sets these values to 0 whereas the resetAllData ( ) method may in fact cause these values to be set to some default value other than 0. The function component 59 defines the specific behaviour of the resetAllData ( ) method. When an function component 59 has multiple optional prerequisite data 33 elements and the function component 59 is used more than once in a session, it may be desirable to reset all prerequisite data 33 on a subsequent call. However there may be a case where this is not the desired behaviour. This behaviour can be overridden using the dontResetAllData attribute.
scope is the scope for the storage of this function component 59 (which overrides the setting for the page defined in the functionComponent:init tag). The scope can be any one of the following values:function, session or request. If not specified, the scope is defined by the functionComponent:init tag.
e.g. session
conditionalExecution="true" this attribute indicates that the execution of this tag 55 is conditional upon the enclosing functionComponent:if tag currently having a true value
This tag 55 contains a body that include functionComponent:prerequisite and functionComponent:error tags as required. Only the name attribute is mandatory.
Returned result data 27 is accessible through a dataReference specification.

The functionComponent:prerequisite Tag
This tag 55 defines one prerequisite data element 33 for the function component 59. This tag 55 must be defined within the body of a functionComponent:call tag. This tag 55 has the following format:

```
<functionComponent:prerequisitetarget="prerequisiteDataReference"
value="literalValue"source="dataReference"optSource="dataReference"
empty="booleanValue" />
```

Where:
prerequisiteDataReference is either the simple name of a prerequisite data element 33 of the function component 59 or else a reference to a data element of a prerequisite data element of the function component. In a preferred embodiment, the prerequisite data reference begins with a reference to a prerequisite data element 33 of the function component 59.
If the target is simply the prerequisite data element 33 itself, then the reference is just the name of the data element (e.g. ordered).
If the prerequisite data element 33 is a structure, then the reference is the name of the data element structure, a dot ('.') and the element name of the structure. (If the element is itself a structure, then it can also be further qualified.) (e.g. userAttributes.firstName).
literalValue is a hard-coded literal value
dataReference is a reference to dynamic data, The reference to dynamic data follows the same specification as defined for data reference value for control tags.
booleanValue is either true or false
In a preferred embodiment, all of the attributes are mandatory except that only one of value or source or optSource or empty maybe specified. If optSource is specified, then the dataReference can be a non-existent data reference.
If empty="true" is specified, then an appropriate value is passed to the set method. For a String attribute, an empty string is passed (i.e. ""). For numeric attributes, a zero (i.e. 0) is passed. For object attributes, a null object is passed (i.e. null).

The functionComponent:debug Tag

This tag 55 defines various debug information that can help with debugging JSP pages. In a preferred embodiment, the tag 55 has the following format:

```
<functionComponent:debugdebugLevel="debugLevel"debugFile=
"debugFile"
value="literalValue" source="dataReference" />
```

Where:
debugLevel is the default debug level for all function components 59, specified as high, medium or low
debugFile is the path to the file that will be used for debug output (In a preferred embodiment, the first time a debug file specification is encountered, that file is opened for appending. All subsequent debug file occurrences are ignored. If no debug file is specified then debug output goes to the System.out stream.)
literalValue is a hard-coded literal value
dataReference is a reference to dynamic data; the reference to dynamic data follows the same specification as defined for data reference value for control tags.
All of the attributes are optional however only one of value or source may be specified. The order of precedence is order followed by value.

The functionComponent:error Tag

This tag defines the handling for one type of error for the function component 59. This tag must be defined within the body of a functionComponent:call tag. This tag has the following format:

```
<functionComponent:errorname="errorDescriptor"page=". . ./
errorPage.jsp" />
```

Where:
errorDescriptor is a string that identifies a specific function component exception; e.g. PasswordMismatch. The function component 59 itself defines the meaning of a particular function component exception. The special value of "*" represents any exception (i.e. a default exception handler).
. . ./errorPage.jsp is the URL to another JSP page 49 that will be invoked if the specified runtime error occurs. The exception is available in the script variable functionComponentException within the error page. If the error page is specified as the special value "ignore" then the exception is ignored. The error page can either be a specific value or a data reference. The reference to dynamic data follows the same specification as defined for data reference value for control tags.
In a preferred embodiment, all of the attributes are mandatory.

The functionComponent:getValue Tag

This tag is used to set a script variable with the value of a returned result data element of an function component. This tag has the following format:

```
<functionComponent:getValuesource="dataReference"optSource="data
Reference" />
```

Where:
dataReference is a reference to dynamic data. The reference to dynamic data follows the same specification as defined for data reference value for control tags.
In a preferred embodiment, all of the attributes are mandatory except that only one of source and optSource may be specified. If optSource is specified, then the dataReference can be a non-existent data reference.
The script variable resultValue is set with the value of the specified returned result data element.

The functionComponent:if Tag

This tag is used to conditionally execute other tag calls and to conditionally generate ML output. This tag has the following format:

```
<functionComponent:if >
    conditional-functionComponent-body
</functionComponent:if>
```

This tag acts as an IF-THEN block. ML output generated from tags within this block is included only if the value of the functionComponent:if block is true at the end of the block. The value of the block is initialized to false at the start of the block. The value of the block is set by calling the following Java method:
FunctionComponentIfTag.setIfValue (PageContext pageContext, Boolean ifValue)
Normally the setIfValue ( ) method would be called from within the execute ( ) method of an function component invoked by a functionComponent:call tag inside the block of the functionComponent:if tag. It is possible to call the setIfValue ( ) method multiple times within the same block. However, it is the last call that determines the final setting for the block that is used to decide whether or not ML output generated within the block should be included in the generated output page.

In addition, it is possible to conditionally execute various tags within the functionComponent:if block. If a tag contains the attribute conditionalExecute="true" then that tag is only executed if the current value of the functionComponent:if block is true. The following tags 55 support the conditionalExecute attribute:functionComponent:call, presentation:control, presentation:producePage The conditionalExecute attribute can be added to other tags as required. It is possible to build a logical "AND" condition for a functionComponent:if block using the conditionalExecute attribute. Suppose there is a function component 59 named "SetIfValueFunctionComponent" that takes the prerequisite data 33 and determines whether or not to call the FunctionComponentIfTag.setIfValue ( ) method. We can use the functionComponent:call tag to invoke this function component twice at the beginning of the functionComponent:if block. On the second functionComponent:call we include the conditionalExecute attribute. This effectively makes the value of the functionComponent:if block the value of the first SetIfValueFunctionComponent call 'AND'ed with the value of the second SetIfValueFunctionComponent call.

Presentation Templates (PT):

Referring to FIGS. 8(*a*) and (*b*) and 9, the presentation template (PT) 61 is illustrated schematically according to a preferred embodiment of the present invention. A set of PT 61 files defines the "look and feel" of a client application, each PT 61 consisting of a series of ML statements that defines a template for a presentation element or output page 79 or portion of an output page 79 of the client application. The set of PT 61 files for the client application are language (e.g., French, English) and format (e.g., HTML, HDML) specific.

In a preferred embodiment, the PT 61 files take one of two forms. Referring to FIG. 8(a), a first or static PT 65 is illustrated. The static PT 65 consists solely of ML statements that define the presentation elements of the output page 79 or portions thereof. As the JSP 49 is processed, the ML statements of the static PT 65 are used to define a static portion of the output page 79, such as the header or footer; i.e., those portions of the output page 79 that are common to all output pages of the client application.

Referring to FIGS. 7 and 8(b), a second or dynamic PT 67 is illustrated. The dynamic PT 67 consists of ML statements that define the presentation elements of the output page 79 or portion of the output page 79. It also includes at least one control 63, which provides a link to the data output 27 that is generated by the FC 59. As the JSP 49 is processed, the ML statements of the dynamic PT 67 defines an output that incorporates the data output 27 of the FC 59. For example, the output page 79 or portion thereof may display the order details of a purchase order (e.g., a list of items purchased) in a table. The data output of the FC 59 maybe the list of items purchased, which are displayed in an HTML table (i.e., control 63 ) having a presentation format defined by the PT 67.

In a preferred embodiment, a well-defined hierarchical file organization is used for the deployment of presentation template files. The hierarchy consists of the following levels, in order:

Application root—This is the root of the hierarchy for this specific application.
Format—This level organizes files by format (e.g. divisions of html, hdml).
Language—This level organizes files by language locale (e.g. divisions of en_US, en_CA, fr_CA).
Application specific level(s)—This (these) level(s) may be defined as required for the specific application.

The individual presentation template files 61 are located within the application specific level(s) if they are specified or else they are located within the language level.

In a preferred embodiment, the common elements of the "look and feel" are segmented into separate presentation template files 61. For example, if all the pages of an application have a common header and common footer, then each of these sections should be extracted into their own files respectively so that they can be "included" by reference rather than having their contents copied in all of the pages of the application. Accordingly, it is recognized that the courier template files 61 and associated FC tags 59 and PC tags 57 can be reused to generate the pages of the application. For example, one of the templates 61 could represent one line of the multi-line table, with the appropriate PC tags 57 and FC tags 59 directing the inserted table content for each invocation of the line template 61.

Using this file organization model, it is possible to determine the physical path to an ML PT 61 file given the application root path, the file format, the language, and the file name including any application specific levels.

For example, an application may have one application specific level defined that has the following divisions:common, orderEntry and orderHistory. The application itself has a series of pages 49 that have to do with entering and processing an order and another set of pages 49 that have to do with selecting and viewing order history. The set of ML presentation template files 61 may be organized in the following way:

```
.../orderApplication/html/en_CA/common/header.html
.../orderApplication/html/en_CA/common/footer.html
.../orderApplication/html/en_CA/orderEntry/search.html
.../orderApplication/html/en_CA/orderEntry/entry.html
.../orderApplication/html/en_CA/orderEntry/submit.html
.../orderApplication/html/en_CA/orderHistory/search.html
.../orderApplication/html/en_CA/orderHistory/display.html
with other sets of files under:
.../orderApplication/html/fr_CA/...
.../orderApplication/hdml/en_CA/...
.../orderApplication/hdml/fr_CA/...
```

The individual ML presentation template files 61 can be designed using an appropriate WYSIWYG editor such as HomeSite for HTML files as developed by Macromedia of San Francisco, Calif. Any other suitable editor known to those skilled in the art may be employed. The ML presentation template files 61 themselves contain "pure" markup language (e.g. HTML).

The ML PT files 61 represent pages that can contain dynamic content; e.g. ML PT 67. Any dynamic content must be placed inside controls 63 located on the page. Each markup language has its own set of controls. Each control 63 has an identifier (i.e. in HTML, id="idValue") keyword defined in order for the dynamic content to be inserted into the control 63. In the ML file, the control may have dummy data. This dummy data is useful for display purposes during the design phase of the ML file. However, this dummy data is removed automatically when the dynamic data is inserted into the control. In the case of an HTML based ML presentation template dynamic file 67, any of the following controls will be considered for dynamic data insertion so long as each control has a unique value for the identifier keyword (i.e., id="idValue"): Text field, Password field, Hidden field, Text area, Table, List box, Check box, Radio button, Image, Push button, Image button, Submit button, Reset button, Link and Span. In alternate embodiments, the ML file may be composed in any other markup language known to those skilled in the art, such as HDML or WML.

Presentation Component (PC):

Referring to FIG. 4, the presentation component (PC) 161 is illustrated schematically. The PC 161 is a distinct, independent piece of presentation functionality. Each presentation component 161 processes the corresponding presentation element. In a preferred embodiment, every presentation component 161 exits as a Java class that is based in a generic base class. When a client application requires a presentation component 161, it is simply instantiated using Java reflection based on the logical name of the presentation component 161. The presentation component 161 conforms to the specification of a Java Bean.

Presentation Component (PC) Tag Extensions:

The presentation component files 161 are involved using a set of presentation component tag extensions 57. The presentation component file custom tag extensions 57 provide the linkage between the controls 63 in the presentation files 67, the dynamic data 27 and the presentation component 161 in the JSP page 49. In addition, these extensions 57 also provide the ability to generate a subsequent display page 79.

The presentation:page Tag

This tag defines that a specific presentation component file 161 is to be used in the current processing page 49. This tag has the following format: 1

```
<presentation:page name="presentation Name" root=" rootPath"
source="fileName" value="fileName"
format="presentationFormat" language="languageSpecification"
absolute="true" />
```

Where:

presentationName is the unique name that this presentation page will be referenced by within this processing page 49 rootPath (optional) is the root path of the file fileName is the file name including any application specific level name presentationFormat is the format of the presentation file 61, which must be one of the following values: html, hdml or wml.

languageSpecification (optional) is the language of the content of the presentation file 61, which if specified, must be one of the following values: en_CA, fr_CA and so on.

In a preferred embodiment, the name and format attributes are mandatory. Exactly one of the source or value attributes must be specified. Each of the attributes except value can be directly specified as a value or else can be a reference (i.e. dataReference) to dynamic data. The path to the presentation file is considered to be relative unless the absolute attribute is specified as true.

The presentation:control Tag

This tag links a control 63 from a dynamic presentation template file 67 to the source of the control's dynamic data and the presentation component 161. This tag is used when the type of control 63 is supported for the particular format of the dynamic presentation template file 67. In a preferred embodiment, this tag has the following format:

```
<presentation:control name=" controlName" type=" controlType"
parentPresentation="parentName"
value="literalValue" source="       dataReference"
optSource="dataReference" empty="booleanValue"
id="identifier" conditionalExecution="true" />
```

Where:

controlName is the unique name that this control will be referenced by controlType is the specific type of the control. If HTML is the selected ML, then the HTML controls include input (requires attribute type set to text for text field, set to password for password field, set to hidden for hidden field, set to button for push button, set to image for image button, set to submit for submit button, set to reset for reset button, set to checkbox for checkbox, set to radio for radio button), text area, table, select (list box), img (image), a (link) or span.

parentName is the name of the parent containing this control which is either a presentation page or another control.

If a control is specified that is immediately contained in a page, then the value is the presentation name, a dot ('.') and the control name. If a control is specified that is within another control that is immediately contained in a page, then the value is the presentation name, a dot ('.'), the immediate control name, a dot ('.') and the control name. There is no limit to the embedding of controls within controls.

literalValue is a hard-coded literal value dataReference is a reference to dynamic data The type of data referenced by this attribute must be compatible with the control type.

The dynamic data reference can be either a reference to keyword-value paired data defined for this processing page or servlet request or else a reference to returned result data from an application component.

If the value of a keyword-value paired data is a simple value, then the reference is simply the keyword itself. e.g. orderNumber If the value of a keyword-value paired data is a structure, then the reference is the keyword, a dot ('.') and the element name of the structure. (If the element is itself a structure, then it can also be further qualified.) e.g. orderHeaderAttr.orderStatus A returned result data reference includes the function component 59 instance name, a dot ('.') and the name of the returned result data element. e.g. OrderGet_OrderEntry.orderID If the returned result data element is a structure and the desired dynamic data 27 is an element of the structure, then the returned result data element is qualified by a dot ('.') and the element name. (If the element is itself a structure, then it can also be further qualified.) e.g. OrderGet_OrderEntry.orderHeaderAttr.orderStatus If the dynamic data reference begins with the character "@" then it is an implicit indirect reference. In this case once the returned result data element has been determined, then it is itself considered to be a dynamic data reference that is then re-evaluated by applying the rules stated above. (If the returned result data element that is subsequently considered to be a dynamic data reference also begins with the character "@" then it is also an implicit indirect reference and the evaluation process begins all over again.)

booleanValue is either true or false identifier (optional) is the identifier of the control in the presentation file The control in the dynamic presentation file 67 must have an equivalent id="identifier" attribute. If the identifier is not specified in the presentation:control tag, then an attribute with name id must be set to the value identifier in a :presentation:attribute tag.

conditionalExecution="true" this attribute indicates that the execution of this tag is conditional upon the enclosing applicationcomponent:if tag currently having a true value The name, type and parentPresentation attributes are mandatory. Only one of the value, source or optSource or empty attributes maybe specified. If optSource is specified, then the dataReference can be a non-existent data reference. The specified attribute provides the body content for the control in the ML file. If none of these attributes are specified then no body content is replaced in the ML file.

The presentation:attribute Tag

This tag specifies a specific attribute for a specific control 63. This tag must be defined within the body of a presentation:control tag. This tag has the following format:

```
<presentation:attribute name="attributeName"
    value="literalValue" source="dataReference"
    optSource="dataReference"
    empty="booleanValue" />
```

Where:
attributeName is the name of the attribute to set
literalValue is a hard-coded literal value
dataReference is a reference to dynamic data
booleanValue is either true or false
All of the attributes are mandatory except that only one of value or source or optSource or empty may be specified. If optSource is specified, then the dataReference can be a non-existent data reference.

The presentation:producePage Tag

This tag defines that output for a display page is to be produced based on the specified presentation template file 61 after first populating all dynamic content into the PT. The output is generated at the time that the tag is encountered in the processing file 49; i.e., during execution of the muli-tier application. If there are multiple producePage tags encountered, then the generated display page 79 will contain the concatenation of the output from each of the producePage tags in the order that they were encountered within the processing file 49. This tag has the following format:

```
<presentation:producePage page="PresentationPageName"
    conditionalExecution="true" />
```

Where:
PresentationPageName is the name of the presentation file 61 to produce output for
The presentation file 61 must have been previously defined by a presentation:page tag.
conditionalExecution="true" this attribute indicates that the execution of this tag is conditional upon the enclosing application component:if tag currently having a true value
The page attribute is mandatory.

The, presentation:clear Tag

This tag clears the JSP 49 output buffer. It is typically used to clear out the empty lines that the JSP server puts in around the XML tags before any content is generated. In HTML, this data is ignored, but plain text documents should not have these extra lines. The tag has no attributes.

The presentation:interceptor Tag

This tag is a body tag that intercepts the output of its body and inserts it into the resultValue page variable and optionally copies it to the page output. This tag has the following format:

```
<presentation:interceptor interceptEnabled="booleanValue"
    duplicateOutput="booleanValue" />
```

Where:
interceptEnabled is an expression that, if true, enables the interceptor
duplicateOutput is an expression that, if true, copies the intercepted output to the enclosing page The interceptEnabled attribute is mandatory; the duplicateOutput attribute is optional.

Defining the Processing Logic for a Servlet Client Application using Processing Files Referring to FIGS. 4, 6(*a*), 6(*b*), 7, 8(*a*), 8(*b*) and 9, the processing logic of a JSP 49 in a servlet client application is illustrated schematically according to a preferred embodiment of the present invention. The processing logic for a servlet client is defined in a set of JSP 49 processing files. A processing file performs two distinct processing roles.

First of all, a processing file 49 provides the ability to invoke function components 59 that implement specific processing functionality. The specific processing functionality includes processing input data 33 and providing output data 27.

The processing file 49 also defines the links 69 between the controls 63 that are defined within the dynamic presentation template files 67 and the dynamic data itself. After all the specific processing functionality has been completed for a specific output page 79 and all of the dynamic data 27 has been generated, the next display page 79 can be produced by populating the dynamic data into the dynamic presentation files 67 and generating the presentation element with the presentation component 161.

In a preferred embodiment, a processing file 49 is implemented using JavaServer Pages (JSP). In order to make the processing files user-friendlier, two sets of custom JSP tag extensions have been introduced. The function component (FC) custom tags 55 provide the ability to invoke function components 59. The presentation file custom tags 61 provide the linkage between dynamic data and the controls 63 in the presentation files and also provide the ability to generate the display page 79 with the presentation component 161.

A client application infrastructure 97 defines the classes which implement the custom JSP FC tag extension 55 and PC tag extension 57 libraries that together make up the functional framework of the client application 71. The classes support the client's function components 59 and the presentation components 161.

The infrastructure 97 provides the interface between function components 59 and the specific application clients. It also provides suitable connection points for servlet GUIs, applet GUIs and direct programmable interfaces. The infrastructure further provides a set of classes, which implement the custom JSP extension libraries responsible for supporting the client application's presentation components 161.

Figure 10:
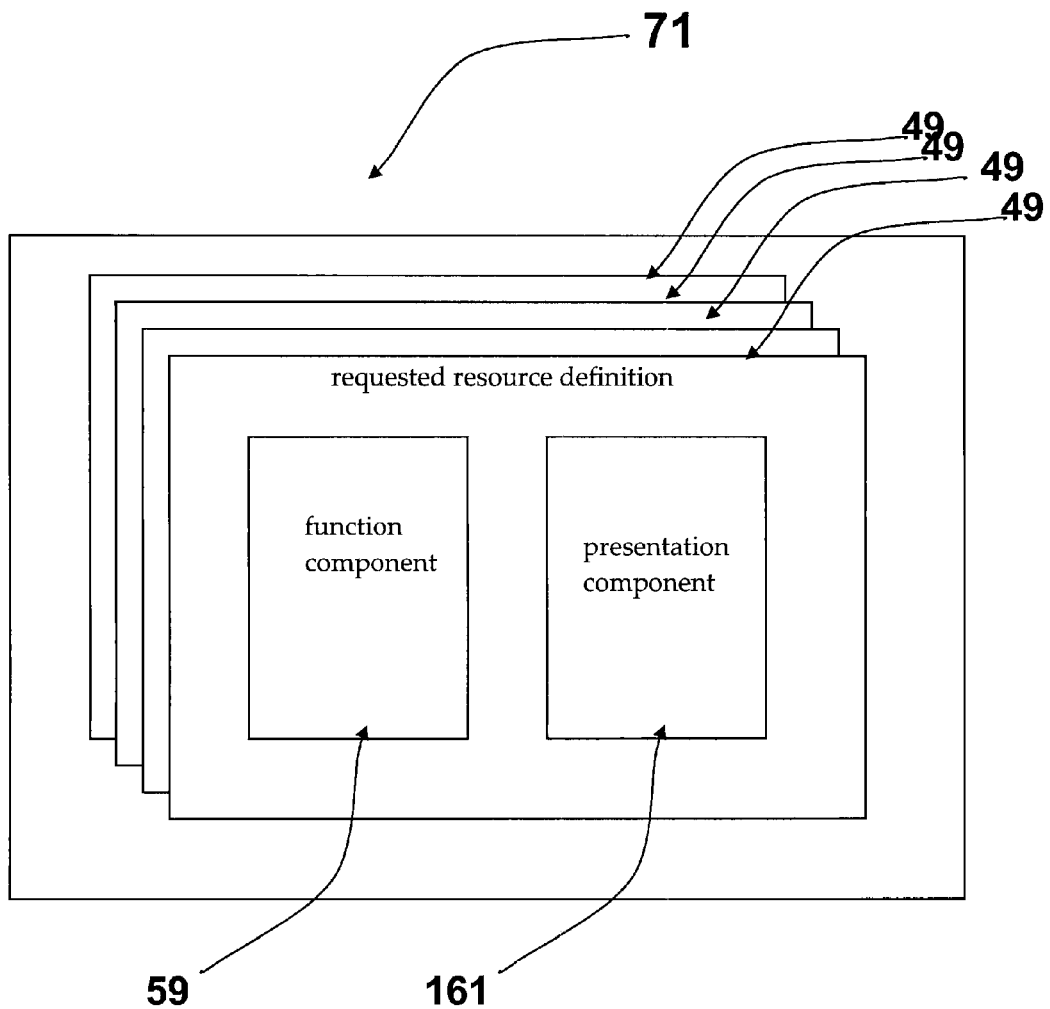
FIG. 10 is a logical view of a client application using a Java Server Page according to an embodiment of the present invention.
Figure 11:
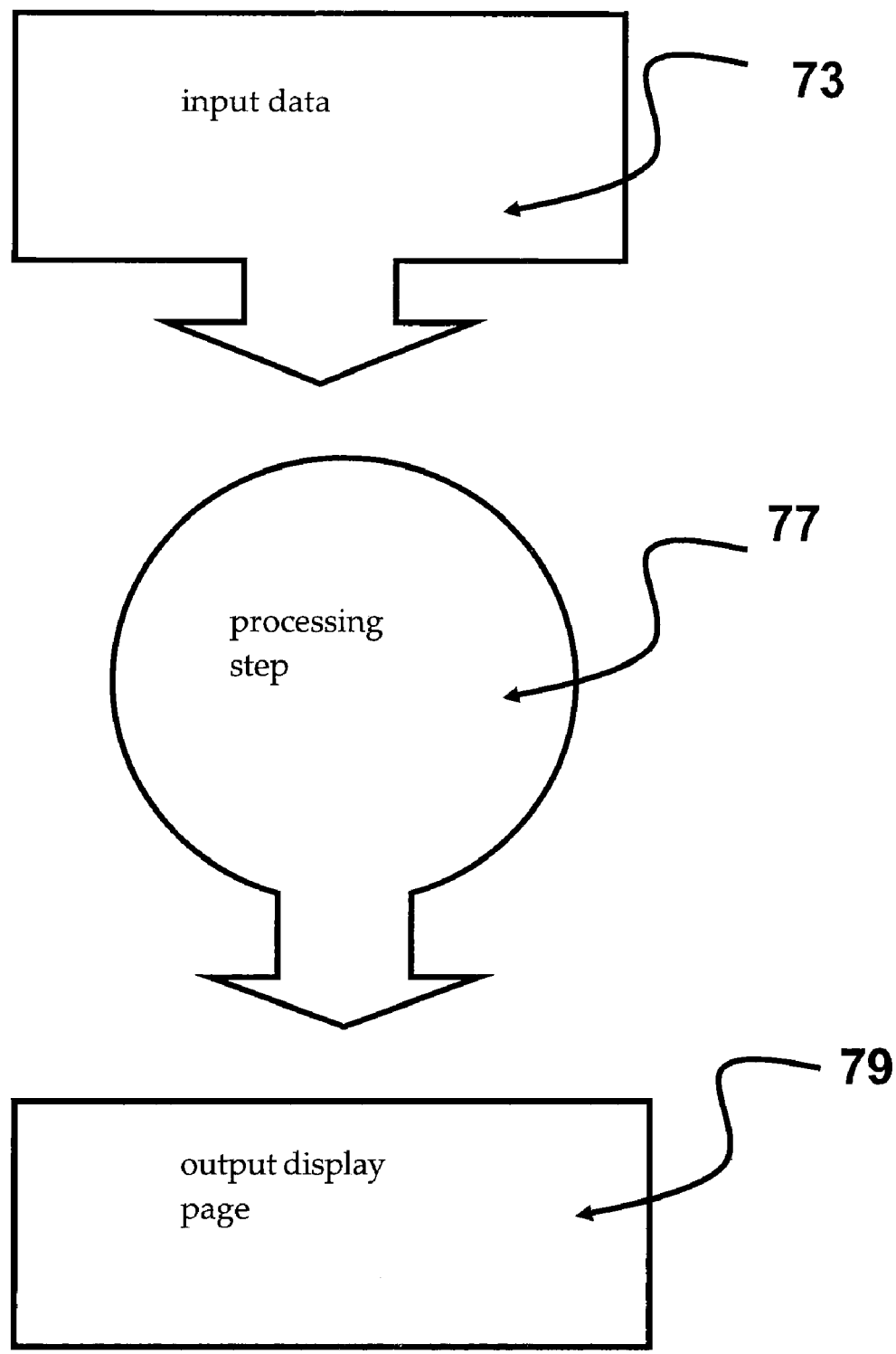
FIG. 11 is a logical view of a processing step of a client application according to the present invention.

Referring to FIGS. 10 and 11, a logical view of a client application 71 assembled in accordance with a preferred embodiment of the present invention is illustrated. For illustrative purposes a servlet client application is described. The servlet engine 23 is invoked by the user entering the URL of the starting JSP 49 of the application 71 from within a browser on terminal 11.

The servlet client 71 logically consists of a series of java server pages 49, with each page defining a portion of the processing logic the client application 71. Each page 49 has one or more associated presentation templates 61 providing the "look and feel" of the page. Each page 49 also has one or more associated function components 59 providing its processing logic and presentation components 161 providing its presentation logic.

At any specific point in the execution of the client application 71, the user operating terminal 11 is viewing a page in a local browser window and interacting with it. The user enters information and then causes (e.g. by "pushing" a button) data from the page to be returned to the web server 15 along with a pointer to the next page 49 of the client application 71. The user's data is returned to the web server 15 in the form of a set of keyword-value pairs 73.

At this point, the next page 49 of the client application 71 is processed, the output data 27 of which is generated by the PC 161 and used in the generation of a new viewing page 79, which is sent back to the user's browser window on terminal 11 and the whole cycle begins again.

In summary, each page 49 of a servlet client application 71:

receives as input, a set of keyword-value paired data 73 performs a processing step 77

Generates a new display page 79 for the user operating terminal 11 containing all of the required embedded programming constructs to both redirect control flow to a subsequent page 49 and to return keyword-value paired data 73 to that subsequent page.

In alternate embodiments, an applet client 93 or a direct programmable interface client 95 may be assembled. (FIG. 13)

The applet client 93 is a Java Swing-based interface to client applications 71 running on terminal 11. The user on terminal 11 interacts directly with the application as it is running locally. The client application 71 communicates across the communications network 13 (e.g., the Internet) with the Net*Suite servers via a CORBA interface 97. Responses are written directly to the screen using Java Swing GUI components.

The direct programmable interface is another mechanism that uses the applications. A direct programmable interface client 95 is a specific set of Java code. The direct client 95 instantiates a set of function components 59 to provide the processing logic for the client application 71. The direct client 95 sets prerequisite data 33, invokes the execute( ) methods and gets returned data 27 for each function component 59 instance as appropriate.

A client using the direct programmable interface provides its own GUI if one is required. The function component 59 linkages are "hard coded" within the client logic itself to define the application.

ILLUSTRATIVE EXAMPLE

Figure 12:
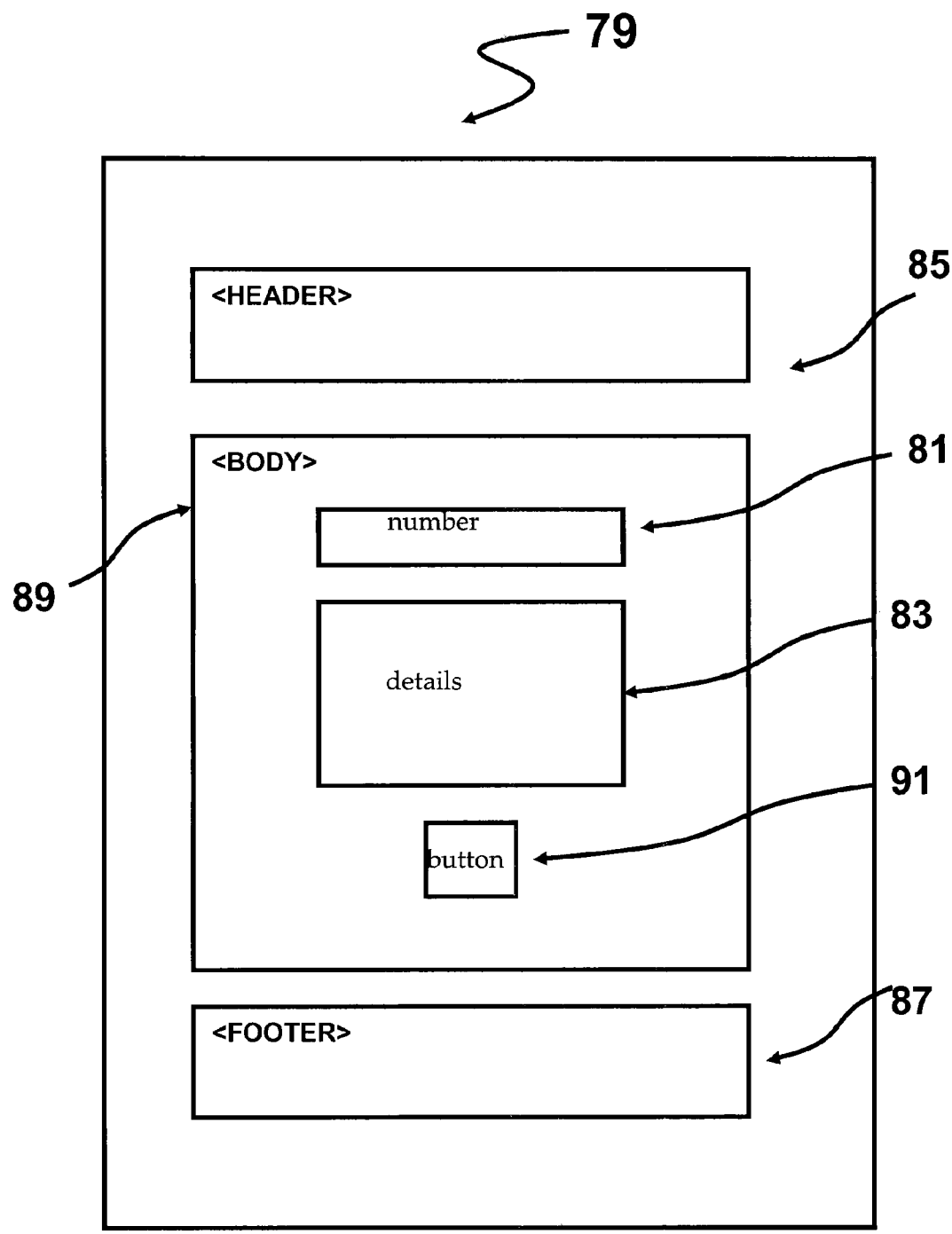
FIG. 12 is a schematic view of the output of a processing step of a client application according to an embodiment of the present invention.

Referring to FIG. 12, the use of FC taglib directives 51, FC tags 55 FCs 59, PC taglib directives 53, PC tags 57 and PCs 161 to generate an output page 79 is illustrated byway of example according to a preferred embodiment of the present invention. In the present example, there is an order entry application that includes an administrative step to approve orders. In this case, an order is submitted after the order is approved.

For this example, it is assumed that the previous JSP 49 selected the order and an order identifier (orderID) FC 59 is available as a returned result from an OrderSelect FC 59 executed on the previous JSP 49.

The current JSP 49 is the OrderSubmit page. The processing logic for this page involves calling a FC 59 (Order-Get) that will retrieve the order details 83 for the selected order. In this case, the resulting output page 79 to be returned to the user's browser window will display the order number 81 and the order details 83. If the order details 83 are not available, then the FC 59 returns a FC_EXCEPTION_1 exception. In this case the application will jump to an error JSP (noOrderError.jsp). Any other exceptions are handled by forwarding to a general error JSP page (error.jsp).

The PTs 61 that define the layout for output page 79 utilize a PT header 85 (OrderApplicationHeader.html) and PT footer 87 (OrderApplicationFooter.html) (in HTML format) that is common across all pages in this application. There is no dynamic data inserted within the PT header 85 or PT footer 87, they are examples of static presentation templates 65.

The PT main body 89 of the current page is from the OrderSubmit HTML file. This file contains a text field (read only) that will display the order number 81. This control is labeled with id=OrderNumField. The order details 83 will be displayed in table format using a table control. The table control is labeled with id=OrderDetails. Finally, there is a submit button 91 on the page which will invoke a subsequent JSP page (submit.jsp) which will actually submit the order. The PT main body 89 is an example of the dynamic PT 67.

The PT HTML files 85, 87 and 89 provide the layout template for the display page 79 generated from the JSP 49, which is generated by the PC 161.

The JSP 49 for this part of the application is as follows.

```
2   <!--*************************************************************
3   This page is used by an administrator to submit an order.
4   *************************************************************-->
5
6   <%@ page session="true" buffer="64kb" autoFlush="true"
7      isThreadSafe="true" errorPage=". . ./errorPage.jsp" %>
<%@ taglib uri="/servlet/FunctionComponentTagsClient.jar"
prefix="application component" %>
8   <%@ taglib uri="/servlet/PresentationComponentTagsClient.jar"
prefix="presentation" %>
9   <functionComponent:init >
10  <!-- Create and OrderGet function component and execute it using the
results from a function component (OrderSelect) executed on a previous
JSP page. -->
11  <functionComponent:call name="OrderGet__OrderEntry" >
12     <functionComponent:prerequisite target="ordered"
13        source="OrderSelect__OrderEntry.orderID" />
14     <functionComponent:errorname="NoOrder"page="noOrderError.jsp" />
15  </functionComponent:call>
16  <!--Define the header presentation. There is no dynamic data in the
header presentation.-->
17  <presentation:page name="header" source="OrderApplicationHeader"
18     language="en__CA" format="html" />
```

-continued

```
19
20 <!-- Define the body presentation. This presentation contains
dynamic data. The dynamic data must be connected to the presentation.
-->
21 <presentation:page name="body" source="OrderSubmit"
22    language="en_CA" format="html" />
23 <presentation:controlname="OrderNumField"type="span"id="OrderNumField"
24    parentPresentation="body"source="OrderGet_OrderEntry.orderNum"
/>
25 <presentation:control name="OrderDetails" type="table"
id="OrderDetails"
26
parentPresentation="body"source="OrderGet_OrderEntry.orderDetailTable"
/>
27
28 <!--Define the footer presentation. There is no dynamic data in the
footer presentation. -->
29 <presentation:page name="footer" source="OrderApplicationFooter"
30    language="en_CA" format="html" />
31
32 <!-- Now that all the elements of the page are available,
33    the page itself can be produced. -->
34 <presentation:producePage page="header" />
35 <presentation:producePage page="body" />
36 <presentation:producePage page="footer" />
```

Referring to FIG. 13, an expanded schematic view of the system 10 and the processed outputs of the client application 71 are illustrated according to a preferred embodiment of the present invention. A network user operating the network terminal 11 requests the remotely located resource (JSP 49) via the network 13.

The JSP 49 includes FC tag library directives 51, which specify the custom FC tags 55 that may be used by the servlet engine 23 when processing the user's request, and PC tag library directives 53, which specify the custom PC tags 57 that may be used by the servlet engine 23 when assembling the output page 79 that is returned to the user at terminal 11. The JSP 49 further includes FC tags 55 that are used to invoke their corresponding FCs 59 and PC tags 57 that provide links to the PCs 161.

The FC tag 55 may be used to call its corresponding FC 59. It does this by specifying the FC 59 to be invoked (by "name"). A further FC tag 55 defines the prerequisite or input_data_33 and provides a reference 101 to the "source" of the input data 33. In the present example, the input data 33 is located in the database 17, which is accessed by the application server 19 via database server 119. Thus when the FC 59 is executed, it requests and receives the input data 33 from the database 17 via the application server 19. The data is then processed by the FC 59 and the data output 27 is generated.

The PC tag may be used to call its corresponding PC 161. It does this by specifying the PC 161 to be involved (by "name"). A reference is also provided to the "source" of the PT 61. Thus, when the PC 161 is executed, it processes the presentation instructions in the presentation template 61 and generates a corresponding presentation element or output 79.

The PC tags 57 may refer to one of two types of PTs 61; static PCs 65 and dynamic PTs 67. The PTs 65 and 67 are referred to by name and location or source. The static PTs 65 are ML files that include ML statements that define presentation elements of a portion of the output page 79. The static PTs 65 neither include references to nor do they incorporate the output data 27 that is generated by the FC 59 during processing by the PC 161. They are generally reserved to defining those elements of the output page 79 that are common to all output pages 79 of the client application 79, such as the header or footer, although their use is not limited to this role.

The dynamic PTs 67 are also ML files that include ML statements that define the presentation elements of a portion of the output page 79. However, they also include at least one control 63, which provides the reference or link 69 to the output data 27 that is generated by the FC 59. The PC tags 57 that refer to the dynamic PTs 67 include, in addition to the name and "source" of the dynamic PT 67, a reference to the type of control 63 to be included in the portion of the output page 79 and a reference or direction 103 to the "output_data_27" that is to be incorporated in the control 63 during processing by PC 161.

Once the servlet engine 23 has executed the compiled java servlet 31 and processed the user's request, it generates the output page 79, the portions of which being defined by the PTs 65 and 67. It should be recognised that the JSP 49 includes a number of Pts 61, each responsible for defining a portion of the output page 79. These PTs 61 can be reusable, such that the same PTs 65, 67 can be linked to differently configured PC tags 57. For example, the PT 67 can be coupled by two different controls having reference 69 to two different output data 27. Therefore, this would result in two tables in the output page 79 having two dissimilar body contents dictated in part by the differing contents of the two output data 27.

Figure 14:
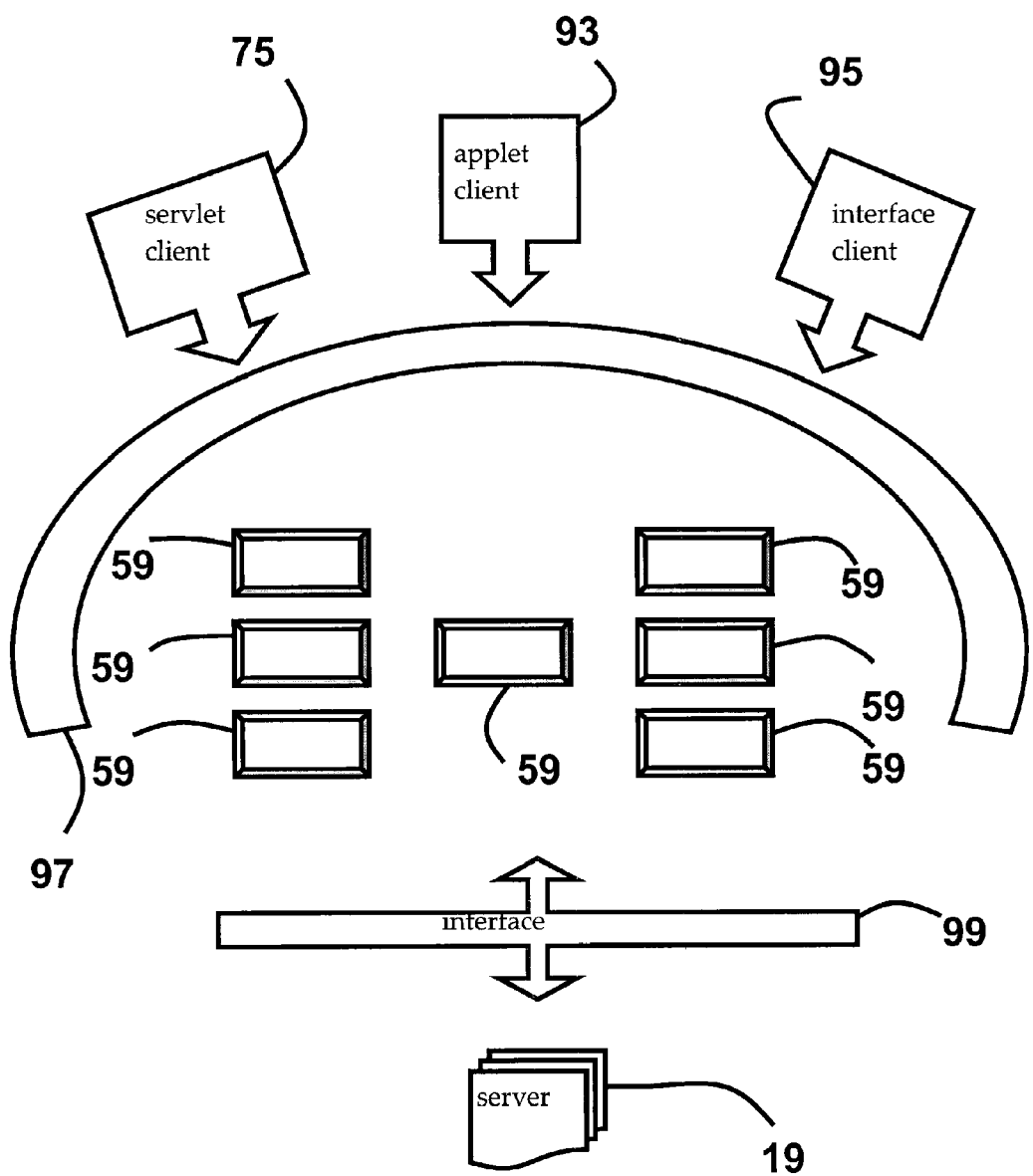
FIG. 14 is a schematic view of the elements of a client application and associated system according to an embodiment of the present invention.

Client Application Infrastructure:

Referring to FIG. 14, the overall architecture of a client application assembled using a series of function components 59 is illustrated. For illustrative purposes, the servlet client 75, the applet client 93 and the direct programmable interface client 95 are all depicted interacting with the FCs 59 via an alternate embodiment of the client application infrastructure 97. The servers 19 implement, for example, the CORBA or EJB interface 99 for the client application 71 to use. Specific server 19 calls are made from within a FC 59 during execution of the client application 71 processing logic.

The client application infrastructure 97 defines the classes which implement the custom JSP FC tag extension 55 and PC tag extension 57 libraries that together make up the functional framework of the client application 71. In a preferred embodiment, one set of classes implements the custom JSP extension libraries responsible for supporting the client application's function components 59 (the function component infrastructure), and a second set of classes implements the custom JSP extension libraries responsible for supporting the client application's presentation components 161 (the presentation component infrastructure).

Function Component Infrastructure (FCI):

The FC 59 infrastructure provides the interface between function components 59 and the specific application clients: servlet client 75, applet client 93, DPI client 95. It provides suitable connection points for servlet GUIs, applet GUIs and direct programmable interfaces. The FC Infrastructure provides a set of classes, which implement the custom JSP extension libraries responsible for supporting the client application's function components 59. These classes include the Function Component InitTag, FunctionComponentInitTagExtraInfo, FunctionComponentCallTag, FunctionComponentCallTagExtraInfo, FunctionComponentPrerequisiteTag, FunctionComponentDebugTag, FunctionComponentErrorTag, FunctionComponentGetValueTag, and the FunctionComponentGetValueTagExtraInfo.

Public Class Function Component InitTag

This class implements the custom JSP tag extension library for initializing the function component custom tags 55. This tag exists to define variables in the FunctionComponentInitTagExtraInfo class.

Public Method doStartTag ( )

Since there is no support for content within this tag, this method simply returns SKIP_BODY.

Public Method doEndTag ( )

There is no specific processing required. The value EVAL_PAGE is returned.

Public Class FunctionComponentInitTagExtraInfo

This class creates all of the scripting variables for the function component tags 55.

Public Class FunctionComponentCallTag

This class implements the custom JSP tag extension library for function component 59 calling support.

Public get/set Methods

In a preferred embodiment, every attribute of the tag 55 must have an associated get and set method. In particular, the following methods are created.

---
.getName( ),setName( )
.getDontResetAllData( ),setDontResetAllData( )
.getDebugLevel( ),setDebugLevel( )
---

Private Method setFunctionComponentInstance ( )

This method saves the current function component 59 instance. The function component 59 instance is set by the functionComponent:call tag since it will be retrieved by the functionComponent:prerequisite tag and the functionComponent:error tag.

Protected Method getFunctionComponentInstance ( )

This method saves the current function component 59 instance.

Protected Method setFunctionComponentException ( )

This method saves a function component exception name and page that was specified by a functionComponent:error tag. The set of exceptions are stored in a hashTable where the key is the exception name and the value is the exception page.

Private Method getFunctionComponentException ( )

This method returns the exception page for the named exception or null if no page was specified.

Public Method doStartTag ( )

The function component 59 name is parsed and separated into the class name and the function component instance description. The function component 59 is then instantiated and the instance description is set. The function component instance name and object reference are saved in a hash table that is part of the session context. In addition, the function component instance itself is saved using the setFunctionComponentInstance ( ) method.

Prerequisite data 33 and exception handling is set within the body of this tag. Actual invocation of the function component 59 is done by the doEndTag ( ) method after the body has been processed.

This tag requires a body therefore this method simply returns EVAL_BODY_TAG.

Public Method doAfterBody ( )

If there is any body content, then it should be appended to the buffered output for the page.

No iteration over the body is required; therefore this method simply returns SKIP_BODY.

Public Method doEndTag ( )

Any buffered output for the page should be written.

All of the prerequisite data 33 must have been set by functionComponent:prerequisite tags in the body.

The execute ( ) method of the function component 59 is invoked.

If an exception is thrown, then it must be interpreted in the following manner. If there was an error descriptor attribute set for the exception, then the exception should be saved in the functionComponentException script variable and the request forwarded to the defined JSP 49. In this case the value SKIP_PAGE is returned. In all other cases, including when no exception was thrown, the value EVAL_PAGE is returned.

Public Class FunctionComponentCallTagExtraInfo

This class implements the scripting variable definition for the functionComponentException that is set in the case that an exception (defined by the functionComponent:error tag) is handled for the functionComponent:call tag.

Public Class FunctionComponentPrerequisiteTag

This class implements the custom JSP tag 55 extension library for function component 59 prerequisite data 33 setting support.

Public get/set Methods

Every attribute of the tag has an associated get and set method. In particular, the following methods are created.

---
.getTarget( ),setTarget( )
.getSource( ),setSource( )
---

The type of each of this attribute is String rather than the actual type of the prerequisite data 33.

```
.getValue( ),setValue( )
.getEmpty( ),setEmpty( )
```

Public Method doStartTag ( )

If this tag is not within a functionComponent:call tag, than an appropriate JspTagException is thrown. The function component 59 object itself can be retrieved using the getFunctionComponentInstance ( ) method of the functionComponent:call tag handler. Since there is no support for content within this tag, this method simply returns SKIP_BODY.

Public Method doEndTag ( )

Setting the target data element is done using reflection on the function component 59 class.

If the empty attribute is set then an empty value is used for the set method. If the value attribute is set then it provides the literal value to use for the set method. Otherwise the source attribute must be interpreted to get the value to use for the set method.

The interpretation of the source attribute involves the following steps.

Separate the base name (everything to the left of the first "." if there is one) from the qualification path (everything to the right of the first "." if there is one)
    If the base name is a script variable name
    Then lookup the script variable name value
    Else if the base name is a servlet request parameter name
    Then lookup the servlet request parameter name value
    Else the base name must be a function component 59 instance name
    Lookup the function component 59 instance name to get the function component 59 instance object
    If there is a qualification path
    Then evaluate the qualification path by calling get methods on each of the elements of the qualification path
    Now there should be a value for the prerequisite data element
    The value EVAL_PAGE is returned.

Public Class FunctionComponentDebugTag

This class implements the custom JSP tag extension library for function component debug support.

Public get/set Methods

In a preferred embodiment, every attribute of the tag has an associated get and set method. In particular, the following methods are created.

```
.getDebugLevel( ),setDebugLevel( )
.getDebugFile( ),setDebugFile( )
.getValue( ),setValue( )
.getSource( ),setSource( )
```

Public Method doStartTag ( )

Since there is no support for content within this tag, this method simply returns SKIP_BODY.

Public Method doEndTag ( )

Setting the target data element is done using reflection on the function component class.

If the empty attribute is set then an empty value is used for the set method. If the value attribute is set then it provides the literal value to use for the set method. Otherwise the source attribute must be interpreted to get the value to use for the set method.

The interpretation of the source attribute involves the following steps.

Separate the base name (everything to the left of the first "." if there is one) from the qualification path (everything to the right of the first "." if there is one)
    If the base name is a script variable name
    Then lookup the script variable name value
    Else if the base name is a servlet request parameter name
    Then lookup the servlet request parameter name value
    Else the base name must be a function component 59 instance name
    Lookup the function component 59 instance name to get the function component 59 instance object
    If there is a qualification path
    Then evaluate the qualification path by calling get methods on each of the elements of the qualification path
    Now there should be a value for the prerequisite data element
    The value EVAL_PAGE is returned.

Public Class FunctionComponentErrorTag

This class implements the custom JSP tag extension library for function component 59 error support.

Public get/set Methods

Every attribute of the tag must have an associated get and set method. In particular, the following methods are created.

```
.getName( ),setName( )
.getPage( ),setPage( )
```

Public Method doStartTag ( )

If this tag is not within a functionComponent:call tag, than an appropriate JspTagException is thrown. The function component 59 object itself can be retrieved using the getFunctionComponentInstance ( ) method of the functionComponent:call tag handler. Since there is no support for content within this tag, this method simply returns SKIP_BODY.

Public Method doEndTag ( )

Defining the error is done by calling the setFunctionComponentException ( ) method of the functionComponent:call tag handler.

The value EVAL_PAGE is returned.

Public Class FunctionComponentGetValueTag

This class implements the custom JSP tag extension library for getting function component 59 returned result data values.

Public get/set Methods

In a preferred embodiment, every attribute of the tag has an associated get and set method. In particular, the following methods are created.

.getSource ( ), setSource ( )

Public Method doStartTag ( )

Since there is no support for content within this tag, this method simply returns SKIP_BODY.

Public Method doEndTag ( )

Setting the target data element is done using reflection on the function component class.

If the empty attribute is set then an empty value is used for the set method. If the value attribute is set then it provides the literal value to use for the set method. Otherwise the source attribute is interpreted to get the value to use for the set method.

The interpretation of the source attribute involves the following steps.

Separate the base name (everything to the left of the first "." if there is one) from the qualification path (everything to the right of the first "." if there is one)
If the base name is a script variable name
Then lookup the script variable name value
Else if the base name is a servlet request parameter name
Then lookup the servlet request parameter name value
Else the base name must be a function component 59 instance name
Lookup the function component 59 instance name to get the function component 59 instance object
If there is a qualification path
Then evaluate the qualification path by calling get methods on each of the elements of the qualification path
Now there should be a value for the prerequisite data element
The value EVAL_PAGE is returned.

Public Class FunctionComponentGetValueTagExtraInfo

This class implements the scripting variable definition for the resultValue that is set for the functionComponent: getValue tag.

Presentation Component Infrastructure (PCI):

The PC 161 Infrastructure provides a set of classes, which implement the custom JSP extension libraries responsible for supporting the client application's presentation components 161. These classes include the PresentationPageTag, PresentationControlTag, PresentationAttributeTag, and the PresentationProducePageTag.

Public Class PresentationPageTag

This class implements the custom JSP tag extension library for presentation component 161 support.

Public get/set Methods

Every attribute of the PC tag 57 must has an associated get and set method. In particular, the following methods are created.

.getName( ),setName( )
.getRoot( ),setRoot( )
.getSource( ),setSource( )
.getFormat( ),setFormat( )
.getLanguage( ),setLanguage( )

Public Method doStartTag ( )

Since there is no support for content within this tag, this method simply returns SKIP_BODY.

Public Method doEndTag ( )

A page producer object is instantiated, named the value of the name attribute and stored in the pageContext. The associated ML file is determined using the value of the source, format and language attributes.

After all processing is complete, the value EVAL_PAGE is returned.

Public Class PresentationControlTag

This set of classes implement the custom JSP tag extension library for presentation component 161 support of a specific control.

Public get/set Methods

Every attribute of the tag has an associated get and set method. In particular, the following methods are created.

.getName( ),setName( )
.getType( ),setType( )
.getId( ),setId( )
.getParentPresentation( ),setParentPresentation( )
.getSource( ),setSource( )
.getValue( ),setValue( )
.getEmpty( ),setEmpty( )

Public Method doStartTag ( )

This tag 57 requires a body therefore this method simply returns EVAL_BODY_TAG.

Public Method doAfterBody ( )

If there is any body content, then it should be appended to the buffered output for the page. No iteration over the body is required; therefore this method simply returns SKIP_BODY.

Public Method doEndTag ( )

This parent name is a known page producer object or control object that is found within the pageContext.

A control of the appropriate type is instantiated and stored in the pageContext.

The control's data control property is set. If the empty attribute is set then an empty value is used for the property. If the value attribute is set then it provides the literal value for the property. Otherwise, the source attribute is interpreted to get the value for the property. The interpretation of the source attribute involves the following steps.

Separate the base name (everything to the left of the first "." if there is one) from the qualification path (everything to the right of the first "." if there is one)
If the base name is a script variable name
Then lookup the script variable name value
Else if the base name is a servlet request parameter name
Then lookup the servlet request parameter name value
Else the base name must be a function component 59 instance name
Lookup the function component 59 instance name to get the function component 59 instance object
If there is a qualification path
Then evaluate the qualification path by calling get methods on each of the elements of the qualification path
Now there should be a value for the prerequisite data element
After all processing is complete, the value EVAL_PAGE is returned.

Public Class PresentationAttributeTag

This set of classes implement the custom JSP tag extension library for presentation component 161 support of attributes of a specific control.

Public get/set Methods

Every attribute of the tag has an associated get and set method. In particular, the following methods are created.

```
.getName( ),setName( )
.getSource( ),setSource( )
.getValue( ),setValue( )
.getEmpty( ),setEmpty( )
```

Public Method doStartTag ( )

Since there is no support for content within this tag, this method simply returns SKIP_BODY.

Public Method doEndTag ( )

The parent control is found within the pageContext and the attribute is set.

If the empty attribute is set then an empty value is used for the property. If the value attribute is set then it provides the literal value for the property. Otherwise the source attribute is interpreted to get the value for the property. The interpretation of the source attribute involves the following steps.

Separate the base name (everything to the left of the first "." if there is one) from the qualification path (everything to the right of the first "." if there is one)

If the base name is a script variable name

Then lookup the script variable name value

Else if the base name is a servlet request parameter name

Then lookup the servlet request parameter name value

Else the base name must be a function component 59 instance name

Lookup the function component 59 instance name to get the function component 59 instance object If there is a qualification path Then evaluate the qualification path by calling get methods on each of the elements of the qualification path Now there should be a value for the prerequisite data element After all processing is complete, the value EVAL_PAGE is returned.

Public Class PresentationProducePageTag

This class implements the custom JSP tag extension library for presentation component 161 support for producing the output page.

Public get/set Methods

Every attribute of the tag has an associated get and set method. In particular, the following methods are created.

.getPage ( ), setPage ( )

Although the invention has been described with reference to certain specific embodiments, various modifications thereof will be apparent to those skilled in the art without departing from the spirit and scope of the invention as outlined in the claims appended hereto.

We claim:

1. A method for hosting a computer executable multi-tier application for interaction over a network with a user interface, the application including a logic tier for determining content data for the application and a presentation tier for determining a presentation form of the content data as a display on the user interface, the method comprising:

accessing a requested resource definition having a sequence of at least one presentation definition and at least one function definition, the presentation definition for identifying a presentation component defined external to the requested resource definition and the function definition for identifying a function component also defined external to the requested resource definition;

invoking the function component as identified by the function definition, the function component being one of a plurality of accessible function components;

receiving an output datum provided by the invoked function component as a result of an operation on an input datum via the function component, the output datum being the content data;

selecting the first presentation component as identified by the presentation definition, the first presentation component being one of a plurality of accessible presentation components;

receiving a first presentation element provided by the first presentation component processing a first presentation instruction of a first presentation template also defined external to the requested resource definition, the first presentation element defining the presentation form of the content data; and combining the first presentation element and the received content data as a display of the multi-tier application;

wherein the display is subsequently delivered to the user interface.

2. The method of claim 1 further comprising:

selecting a second presentation component as identified by a second presentation definition of the requested resource definition, the second presentation component having access to a second presentation template including a second presentation instruction for defining a corresponding second presentation element; and receiving a second presentation element provided by the second presentation component processing the second presentation instruction;

wherein the second presentation element is combined with the first presentation element and the received content data as the display of the multi-tier application for subsequent delivery to the user interface.

3. The method of claim 2, wherein the presentation templates are computer readable files.

4. The method of claim 3, wherein the presentation instructions are selected from the group consisting of: layout, style and format of the first presentation element.

5. The method of claim 4, wherein the presentation instructions are written in a markup language.

6. The method of claim 5, wherein the markup language is selected from the group consisting of: Hypertext Markup Language (HTML), Handheld Device Markup Language (HDML) and Wireless Markup Language (WML).

7. The method of claim 1, wherein the first template further comprises an output data presentation instruction for further defining the corresponding first presentation element to include the output datum as the data content.

8. The method of claim 7 comprising the additional step of: directing the first presentation component to process the output datum presentation instruction, wherein the first presentation component processes the output datum presentation instruction and generates the first presentation element incorporating the output datum during execution of the multi-tier application.

9. The method of claim 7, wherein the output datum presentation instruction defines a control within which the output datum is presented.

10. The method of claim 9, wherein the control is selected from the group consisting of Text field, Password field, Hidden field, Text area, Table, List box, Check box, Radio button, Image, Push button, Image button, Submit button, Reset button, Link and Span.

11. The method of claim 1, wherein the first presentation component is a computer executable file.

12. The method of claim 11, wherein the computer executable file is a java bean.

13. The method of claim 1, wherein the first function component is a computer executable file.

14. The method of claim 13, wherein the computer executable file is a java bean.

15. The method of claim 1, wherein the first presentation component is linked to the first presentation template by a direction element included in the presentation definition.

16. The method of claim 15, wherein the direction element specifies the location of the first presentation template and directs the first presentation component to the specified location.

17. The method of claim 16, wherein the direction element is a delimiter expressed in a structured definition language of the requested resource definition.

18. The method of claim 17, wherein the delimiter is selected from the group consisting of: page Tag; control Tag; attribute Tag; producePage Tag; clear Tag; and interceptor Tag.

19. The method of claim 17, wherein the delimiter is expressed as a directive of a direction module as the requested resource definition, the direction module implementing the multi-tier application.

20. The method of claim 19, wherein the direction module is a java server page.

21. The method of claim 19, wherein the direction module is a java server page.

22. The method of claim 1, wherein the first function component is linked to the input datum by a direction element included in the function definition.

23. The method of claim 22, wherein the direction element specifies the location of the input datum and directs the first function component to the specified location.

24. The method of claim 23, wherein the direction element is a delimiter expressed in a structured definition language of the requested resource definition.

25. The method of claim 24, wherein the delimiter is selected from the group consisting of:
init Tag; call Tag; prerequisite Tag; debug Tag; error Tag; getValue Tag; if Tag.

26. The method of claim 25, wherein the delimiter is expressed as a directive of a direction module as the requested resource definition, the direction module implementing the multi-tier application.

27. The method of claim 1 further comprising the step of representing a display item on the user interface as a plurality of display portions, at least two of the portions associated with a different one of presentation templates.

28. The method of claim 27, wherein the presentation templates are reusable such that one of the templates is used to generate at least two of the portions.

29. The method of claim 1, wherein a plurality of function operations are coupled to the requested resource definition via corresponding ones of the function definition and a plurality of presentation elements are coupled to the requested resource definition via corresponding ones of the presentation definition, the presentation definitions and function definitions are part of the sequence, such that presentation characteristics of the presentation elements and functional characteristics of the function operations are also defined external to the requested resource definition.

30. A system for hosting a computer executable multi-tier application for interaction over a network with a user interface, the application including a logic tier for determining content data for the application and a presentation tier for determining a presentation form of the content data as a display on the user interface, the system comprising:
a computer readable storage medium;
a requested resource definition stored on the computer readable storage medium and having a sequence of at least one presentation definition and at least one function definition, the presentation definition for identifying a presentation component defined external to the requested resource definition and the function definition for identifying a function component also defined external to the requested resource definition;
the function component stored on the computer readable storage medium and configured for being invoked as identified by the function definition, the function component being one of a plurality of accessible function components;
an engine stored on the computer readable storage medium and configured for receiving an output datum provided by the invoked function component as a result of an operation on an input datum via the function component, the output datum being the content data;
the engine further configured for:
selecting the first presentation component as identified by the presentation definition, the first presentation component being one of a plurality of accessible presentation components,
receiving a first presentation element provided by the first presentation component processing a first presentation instruction of a first presentation template also defined external to the requested resource definition, the first presentation element defining the presentation form of the content data, and
combining the first presentation element and the received content data as a display of the multi-tier application;
wherein the display is subsequently delivered to the user interface.

31. The system of claim 30 further comprising:
a second presentation template stored on the computer readable medium and the engine further configured for
selecting the second presentation component as identified by a second presentation definition of the requested resource definition, the second presentation component having access to a second presentation template including a second presentation instruction for defining a corresponding second presentation element; and
receiving a second presentation element provided by the second presentation component processing the second presentation instruction;
wherein the second presentation element is combined with the first presentation element and the received content data as the display of the multi-tier application for subsequent delivery to the user interface.

32. The system of claim 31, wherein the presentation templates are computer readable files.

33. The system of claim 32, wherein the presentation instructions are selected from the group consisting of: layout, style and format of the first presentation element.

34. The system of claim 33, wherein the presentation instructions are written in a markup language.

35. The system of claim 34, wherein the markup language is selected from the group consisting of: Hypertext Markup Language (HTML), Handheld Device Markup Language (HDML) and Wireless Markup Language (WML).

36. The system of claim 31, wherein a plurality of function operations are coupled to the requested resource definition via corresponding ones of the function definition and a plurality of presentation elements are coupled to the requested resource definition via corresponding ones of the presentation definition, the presentation definitions and function definitions are part of the sequence, such that presentation characteristics of the presentation elements and functional characteristics of the function operations are also defined external to the requested resource definition.

37. The system of claim 30, wherein the first template further comprises an output data presentation instruction for further defining the corresponding, first presentation element to include the output datum as the data content.

38. The system of claim 37, wherein the first presentation component processes the output datum presentation instruction and generates the first presentation element incorporating the output datum during execution of the multi-tier application.

39. The system of claim 37, wherein the output datum presentation instruction defines a control within which the output datum is presented.

40. The system of claim 39, wherein the control is selected from the group consisting of Text field, Password field, Hidden field, Text area, Table, List box, Check box, Radio button, Image, Push button, Image button, Submit button, Reset button, Link and Span.

41. The system of claim 39, wherein the first presentation component is a computer executable file.

42. The system of claim 41, wherein the computer executable file is a java bean.

43. The system of claim 30, wherein the first function component is a computer executable file.

44. The system of claim 43, wherein the computer executable file is a java bean.

45. The system of claim 30, wherein the first presentation component is linked to the first presentation template by a direction element included in the presentation definition.

46. The system of claim 45, wherein the direction element specifies the location of the first presentation template and directs the first presentation component to the specified location.

47. The system of claim 46, wherein the direction element is a delimiter expressed in a structured definition language of the requested resource definition.

48. The system of claim 47, wherein the delimiter is selected from the group consisting of: page Tag; control Tag; attribute Tag; producePage Tag; clear Tag; and interceptor Tag.

49. The system of claim 47, wherein the delimiter is selected from the group consisting of: page Tag; control Tag; attribute Tag; producePage Tag; clear Tag; and interceptor Tag.

50. The system of claim 49, wherein the direction module is a java server page.

51. The system of claim 49, wherein the direction module is a java server page.

52. The system of claim 30, wherein the first function component is linked to the input datum by a direction element included in the function definition.

53. The system of claim 52, wherein the direction element specifies the location of the input datum and directs the first function component to the specified location.

54. The system of claim 53, wherein the direction element is a delimiter expressed in a structured definition language of the requested resource definition.

55. The system of claim 54, wherein the delimiter is selected from the group consisting of: init Tag; call Tag; prerequisite Tag; debug Tag; error Tag; getValue Tag; if Tag.

56. The system of claim 55, wherein the delimiter is expressed as a directive of a direction module as the requested resource definition, the direction module implementing the multi-tier application.

* * * * *